(12) United States Patent
Kim et al.

(10) Patent No.: US 12,143,447 B2
(45) Date of Patent: Nov. 12, 2024

(54) HUB DEVICE OF IoT ENVIRONMENT, AND METHOD FOR PROCESSING EVENT BASED ON LOCAL NETWORK

(71) Applicant: Samsung Electronics Co., Ltd., Suwon-si (KR)

(72) Inventors: Seokhyun Kim, Suwon-si (KR); Eunchul Kim, Suwon-si (KR); Jongwon Lee, Suwon-si (KR); Gajin Song, Suwon-si (KR); Sunkee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/320,621

(22) Filed: May 19, 2023

(65) Prior Publication Data

US 2023/0300197 A1 Sep. 21, 2023

Related U.S. Application Data

(63) Continuation of application No. PCT/KR2021/018732, filed on Dec. 10, 2021.

(30) Foreign Application Priority Data

Dec. 11, 2020 (KR) .................. 10-2020-0173244

(51) Int. Cl.
*G06F 15/16* (2006.01)
*G16Y 10/75* (2020.01)
(Continued)

(52) U.S. Cl.
CPC .............. *H04L 67/12* (2013.01); *G16Y 10/75* (2020.01); *G16Y 30/00* (2020.01); *H04L 67/10* (2013.01)

(58) Field of Classification Search
CPC ......... H04L 67/12; H04L 67/10; H04L 67/63; H04L 45/24; H04L 65/40; H04L 12/2827;
(Continued)

(56) References Cited

U.S. PATENT DOCUMENTS

| 7,532,594 B2 | 5/2009 | Lin et al. |
| 8,149,095 B2 | 4/2012 | Hayashi et al. |

(Continued)

FOREIGN PATENT DOCUMENTS

| JP | 2010-086115 A | 4/2010 |
| JP | 2012-222442 A | 11/2012 |

(Continued)

OTHER PUBLICATIONS

International Search Report with Written Opinion and English translation dated Mar. 14, 2022; International Appln. No. PCT/KR2021/018732.

*Primary Examiner* — Richard G Keehn
(74) *Attorney, Agent, or Firm* — Jefferson IP Law, LLP

(57) ABSTRACT

An electronic device is provided. The electronic device includes a communication module, a memory and a processor operatively connected to the communication module and the memory, wherein the processor can be configured to receive, from a cloud server, through the communication module, a trigger event sensed by a first external device and rule information in which at least one from among a rule set, destination, and an operation command corresponding to the trigger event is mapped, so as to store same in a local rule database of the memory, receiving the trigger event from the first external device through the communication module, confirm, from the local rule database, the rule information mapped to the received trigger event, and transmit, to a
(Continued)

second external device, through the communication module, information related to the trigger event on the basis of the confirmed rule information.

20 Claims, 19 Drawing Sheets

(51) Int. Cl.
*G16Y 30/00* (2020.01)
*H04L 67/10* (2022.01)
*H04L 67/12* (2022.01)

(58) Field of Classification Search
CPC ........ G16Y 10/75; G16Y 10/80; G16Y 30/00; G16Y 40/30; G06F 16/23; G06F 16/901; H04W 4/70
See application file for complete search history.

(56) References Cited

U.S. PATENT DOCUMENTS

| | | | |
|---|---|---|---|
| 9,692,784 B1* | 6/2017 | Nenov | ................ H04L 63/1416 |
| 9,819,699 B1* | 11/2017 | Nenov | .................... H04L 67/60 |
| 10,001,759 B2 | 6/2018 | Gupta | |
| 10,002,524 B2 | 6/2018 | Shim et al. | |
| 10,110,394 B2 | 10/2018 | Kim et al. | |
| 10,193,981 B2 | 1/2019 | Cook | |
| 10,713,007 B2 | 7/2020 | Aiken et al. | |
| 10,820,187 B2 | 10/2020 | Cho et al. | |
| 10,944,794 B2* | 3/2021 | Dhoble | ................. H04W 12/37 |
| 11,729,243 B2* | 8/2023 | Oyman | ................... H04L 65/70 709/219 |
| 2010/0325493 A1 | 12/2010 | Morimura et al. | |
| 2016/0072839 A1* | 3/2016 | Mortimore, Jr. | .... H04L 63/0876 726/1 |
| 2017/0078448 A1* | 3/2017 | Overman | ........... G06F 16/2365 |
| 2017/0187447 A1 | 6/2017 | Cho et al. | |
| 2018/0152517 A1 | 5/2018 | Zhong et al. | |
| 2019/0140906 A1* | 5/2019 | Furuichi | ............. H04L 41/0823 |
| 2019/0306242 A1* | 10/2019 | Thummalapalli | ... H04L 41/0806 |
| 2020/0045611 A1 | 2/2020 | Wang et al. | |
| 2020/0076799 A1* | 3/2020 | Lackey | ................... G06F 21/73 |
| 2020/0145415 A1* | 5/2020 | Berdy | ................ H04L 63/0807 |
| 2020/0213193 A1* | 7/2020 | Newell | .................... H04W 4/70 |
| 2020/0282564 A1* | 9/2020 | Heintzelman | .......... G05B 15/02 |
| 2020/0374205 A1* | 11/2020 | Sharma | ................... H04L 67/12 |
| 2021/0067379 A1* | 3/2021 | Umakoshi | ............... H04L 41/08 |
| 2021/0306831 A1* | 9/2021 | Seed | ........................ H04W 4/38 |
| 2021/0377361 A1* | 12/2021 | Rajani | ................... H04W 12/61 |
| 2022/0053065 A1* | 2/2022 | Wen | ........................ H04L 69/16 |
| 2022/0159538 A1* | 5/2022 | Stammers | ............ H04W 40/22 |

FOREIGN PATENT DOCUMENTS

| | | |
|---|---|---|
| KR | 10-2016-0018146 A | 2/2016 |
| KR | 10-2016-0132747 A | 11/2016 |
| KR | 10-2017-0075516 A | 7/2017 |
| KR | 10-1778768 B1 | 9/2017 |
| KR | 10-2018-0120451 A | 11/2018 |
| KR | 10-2019-0086325 A | 7/2019 |
| KR | 10-2062580 B1 | 2/2020 |

\* cited by examiner

HUB DEVICE OF IoT ENVIRONMENT, AND METHOD FOR PROCESSING EVENT BASED ON LOCAL NETWORK

CROSS-REFERENCE TO RELATED APPLICATION(S)

This application is a continuation application, claiming priority under § 365(c), of an International application No. PCT/KR2021/018732, filed on Dec. 10, 2021, which is based on and claims the benefit of a Korean patent application number 10-2020-0173244, filed on Dec. 11, 2020, in the Korean Intellectual Property Office, the disclosure of which is incorporated by reference herein in its entirety.

BACKGROUND

1. Field

The disclosure relates to Internet of things (IoT). More particularly, the disclosure relates to a method of processing a rule of a hub device existing in a local network of an IoT environment.

2. Description of Related Art

A clouding computing technology is a technology that provides a user with computing resources existing in the location different from the user through a network to provide a computing service such as a server, a storage space, software, or analysis. Clouding computing is used to process data generated by Internet of things (IoT). Data or content of the user collected by IoT devices may be stored in a cloud server, and a cloud service may be provided to the user through data processing.

A rapidly growing IoT environment allows the user to easily manage and use various devices through the connection between the various devices. As an embodiment of the service provided in the IoT environment, there is an automation technology. The automation technology is a technology that makes respective devices interact with each other to operate according to a preset condition even though there is no user command. The automation technology may make the IoT environment of the user be an optimal environment for the user.

The above information is presented as background information only to assist with an understanding of the disclosure. No determination has been made, and no assertion is made, as to whether any of the above might be applicable as prior art with regard to the disclosure.

SUMMARY

An automation technology of an IoT environment may be configured through the cloud. For example, a specific device may transmit its own state change or operation to a cloud server and the cloud server may give instructions to another device according to a rule installed by the user, so as to perform automation. Through the cloud-based automation technology, all devices in the IoT environment may be connected to the cloud and packets of respective devices may be transferred to other devices through the cloud, and accordingly, an increase in delay, a security problem, and/or an increase in server costs may be caused.

Aspects of the disclosure are to address at least the above-mentioned problems and/or disadvantages and to provide at least the advantages described below. Accordingly, an aspect of the disclosure is to provide a method of processing a rule of a hub device existing in a local network of an IoT environment and an electronic device that operates another device on the basis of an event generated in a specific device based on a local network without transmission of data to the cloud.

Additional aspects will be set forth in part in the description which follows and, in part, will be apparent from the description, or may be learned by practice of the presented embodiments.

In accordance with an aspect of the disclosure, an electronic device is provided. The electronic device includes a communication module, a memory, and a processor operatively connected to the communication module and the memory, wherein the processor is configured to receive rule information of mapping a trigger event detected by a first external device and at least one of a rule set, a destination, or an action command corresponding to the trigger event from a cloud server through the communication module and store the rule information in a local rule database of the memory, receive the trigger event from the first external device through the communication module, identify the rule information mapped to the received trigger event in the local rule database, and transmit information related to the trigger event to a second external device through the communication module, based on the identified rule information.

In accordance with another aspect of the disclosure, a method of processing a local network-based event by an electronic device is provided. The method includes receiving rule information of mapping a trigger event detected by a first external device and at least one of a rule set, a destination, or an action command corresponding to the trigger event from a cloud server and storing the rule information in a local rule database, receiving the trigger event from the first external device, identifying rule information mapped to the received trigger event in the local rule database, and transmitting information related to the trigger event to a second external device, based on the identified rule information.

In accordance with another aspect of the disclosure, an electronic device is provided. The electronic device includes a communication module, a memory, and a processor operatively connected to the communication module and the memory, wherein the processor is configured to receive rule information of mapping a trigger event, an action command indicating an operation to be performed in response to the trigger event, and a first external device to execute the action command from a cloud server through the communication module and store the rule information in a local rule database of the memory, receive information related to the trigger event from a second external device through the communication module, identify the action command and the first external device to execute the action command in the local rule database, based on the received information related to the trigger event, and transmit the action command to the first external device through the communication module.

Various embodiments of the disclosure can provide a hub device of an IoT environment and a local network-based event processing method of the hub device capable of operating another device on the basis of an event generated in a specific device based on the local network without transmission of data to the cloud.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
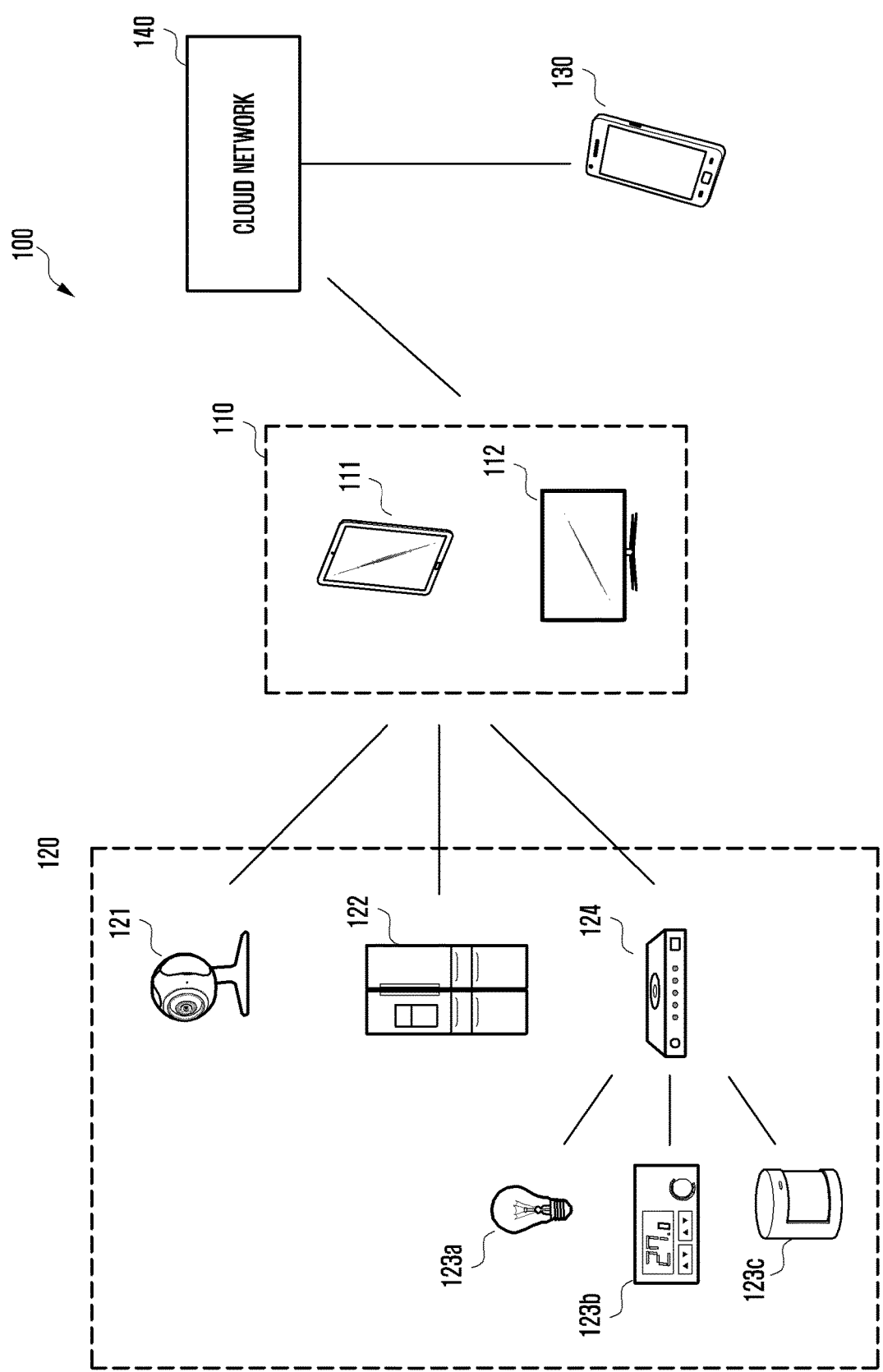
FIG. 1 illustrates devices within an IoT environment according to an embodiment of the disclosure.

FIG. 1 illustrates devices within an IoT environment (or an IoT system) according to an embodiment of the disclosure.

Referring to FIG. 1, an Internet of things (IoT) system 100 (or edge computing system) may include at least one leaf device 120, at least one hub device 110 (or edge device), a user device 130, and a cloud network 140. For example, the leaf device 120, the hub device 110, and the user device 130 may be disposed at the adjacent location (for example, within home) and connected to the same home network (for example, same access point (AP), and the cloud network 140 may be located remotely but connected to the leaf device 120, the hub device 110, and the user device 130 through the Internet.

In various embodiments of the disclosure, an edge computing service may mean a technology that transmits data acquired by the lead device to the hub device located adjacent to the lead device in the same home network and provides a series of data processing of the hub device and other services. In various embodiments of the disclosure, a device (for example, a camera 121, a refrigerator 122, a bulb 123a, a digital thermometer 123b, or a motion sensor 123c) acquiring data through a sensor is defined as the leaf device, but the leaf device may be defined as another name such as a client device of the edge computing service, an end device, a sensor device, an IoT device, or a slave device. Further, in various embodiments of the disclosure, the hub device is defined, but the hub device may be defined as another name such as an edge device of the edge computing service, an edge server, a server device, a master device, or a service device.

In the disclosure, it is described that the devices are classified into the leaf device 120, the hub device 110, and the user device 130 within the edge computing system 100 according to functions or operations thereof, but the same device (for example, a smartphone or a tablet personal computer (PC)) may operate as one of the leaf device 120, the hub device 110, and the user device 130 according to circumstances. In other words, the name and/or the definition of the device described in various embodiment of the disclosure does not limit functions and/or operations of the corresponding device.

According to various embodiments, the leaf device 120 is an end point of the IoT system 100 and may collect various pieces of data through a sensor and transmit the data to the hub device 110 or the cloud network 140. Further, the leaf device 120 may perform various operations according to command transmitted from the cloud network 140 or the user device 130. Referring to FIG. 1, the device, such as the camera 121, the refrigerator 122, the bulb 123a, the digital thermometer 123b, or the motion sensor 123c, may be the leaf device 120.

According to various embodiments, at least some (for example, the camera 121 and the refrigerator 122) of the leaf device 120 may access to the cloud network 140 through the Internet, a device (for example, the bulb 123*a*, the digital thermometer 123*b*, or the motion sensor 123*c*) which does not support an Internet protocol (IP) in the leaf device 120 may transmit sensed data to a relay device 124 through supported non-IP-based communication (for example, Bluetooth or Zigbee), and the relay device 124 may transmit sensed data of the respective leaf devices 123*a*, 123*b*, and 123*c* to the cloud network 140 through the Internet.

According to various embodiments, the cloud network 140 may include various server devices (for example, an IoT management server and an IoT hub server) which are located in the network and support the cloud computing service in the IoT system 100. The cloud network 140 may perform computing processing for sensed data received from the leaf device 120 and transmit a command for the control of the leaf device 120.

According to various embodiments, the cloud network 140 may perform a function of operating and managing a specific device within the home network to operate as the hub device 110. For example, the cloud network 140 may include an IoT server (for example, an IoT management server or an IoT hub server), and the IoT server may perform the edge computing service of registering, connecting, and managing the leaf device 120 with the hub device 110 and provide modules (for example, a device module and a service module) required for the edge computing service to the hub device 110.

According to various embodiments, the hub device 110 may directly process data received from the leaf device 120 or transmit the same to the cloud network 140 (for example, the IoT server). The hub device 110 may be a device including hardware and/or software resources required for the edge computing service such as a television (TV) 112 or a tablet PC 111. The hub device 110 may be connected to the cloud network 140 through the Internet and communicate with the leaf device 120 through direct communication, a mesh network, or an access point.

According to various embodiments, a plurality of hub devices 110 may exist within the home network, and the leaf device 120 may be connected to one of the plurality of hub devices 110 to transmit data. For example, the hub device 110 may download modules (for example, the device module and the service module) required for the edge computing service from the cloud network 140 and execute the modules when the specific leaf device 120 is connected.

According to various embodiments, the hub device 110 may perform a unique device function (for example, an image output function of the TV) and may perform the edge computing service through hardware and/or software resources at least partially simultaneously with the performance of the unique function or during an idle time in which the unique function is not performed.

According to various embodiments, the hub device 110 may store rule information including information for event automation processing. For example, the rule information may be a rule mapping an action command indicating an operation to be operated by another lead device in response to a trigger event generated in a specific leaf device. The hub device 110 may receive rule information from the cloud network 140 and construct database in a memory of the hub device 110. A detailed configuration and operation of the hub device 110 is described in more detail with reference to FIG. 5.

According to various embodiments, the user device 130 may provide various user interfaces related to the edge computing service through an application. For example, the user device 130 may display data (for example, camera video streaming) acquired by the leaf device 120 or resultant data (for example, person recognition) obtained by processing the data by the hub device 110 or the cloud network 140 on the display. Further, the user device 130 may receive a user input such as the connection of the hub device 110 and/or the leaf device 120 or server registration and transmit the user input to the cloud network 140. A detailed configuration and operation of the user device 130 are described in more detailed with reference to FIG. 4.

Figure 2A:
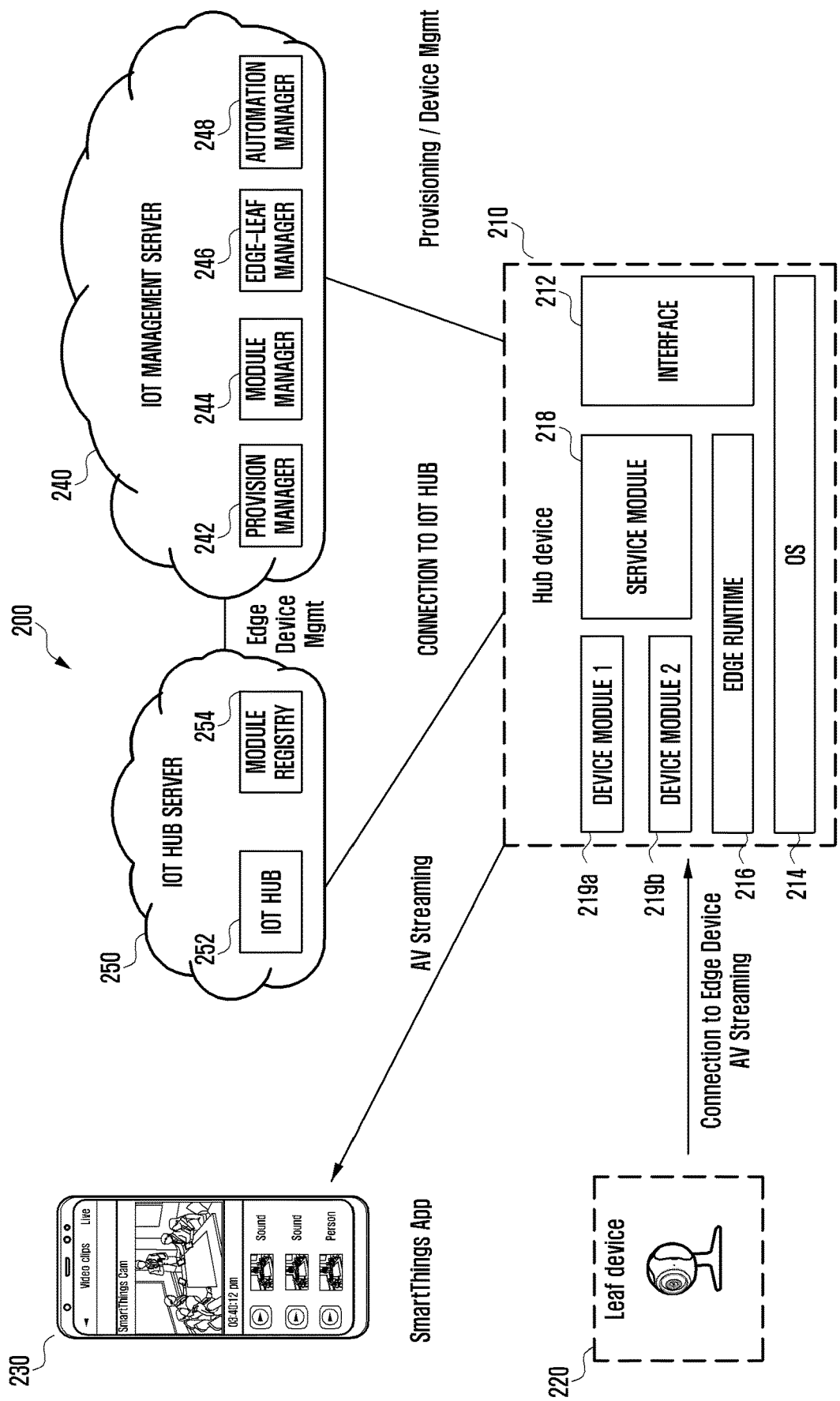
FIGS. 2A and 2B illustrate respective devices of an IoT system according to various embodiments of the disclosure.
Figure 2B:
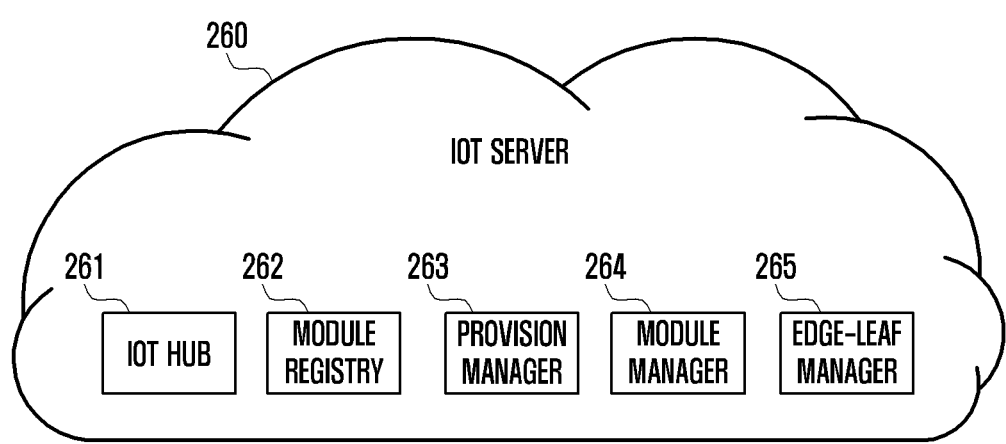

FIGS. 2A and 2B illustrate respective devices of the edge computing system according to various embodiments of the disclosure.

Referring to FIG. 2A, an edge computing system 200 (or the IoT system) may include a leaf device 220, a hub device 210, a user device 230, an IoT hub server 250, and an IoT management server 240. As described with reference to FIG. 1, there are various IoT devices in the home network, and one lead device (for example, the camera 121 of FIG. 1) and one hub device (for example, the TV 112 of FIG. 1) are described as examples in FIG. 2A.

According to various embodiments, the IoT management server 240 (for example, SmartThings™ server) is a server device that provides various services for determining, connecting, and/or operating the edge computing service and may include a provision manager 242, a module manager 244, an edge-leaf manager 246, and an automation manager 248.

According to various embodiments, the provision manager 242 may perform a function of performing relaying between the hub device 210 and the IoT hub server 250 so as to allow the hub device 210 to be connected to the IoT hub server 250. For example, when the hub device 210 is initially registered in the IoT management server 240, the provision manager 242 may transmit connection string for allowing the hub device 210 to be connected to the IoT hub server 250 to the hub device 210.

According to various embodiments, the module manager 244 may manage information on various modules provided for the edge computing service and devices supporting respective services. The modules required for performing the edge computing service may include device modules 219*a* and 219*b* for allowing the hub device 210 to transmit data transmitted from the leaf device 220 to an external server (for example, IoT hub server 250) and a service module 218 including programs executed for implementing the service in the hub device 210 on the basis of data transmitted by the leaf device 220.

According to various embodiments, the edge-leaf manager 246 may manage a connection state between the hub device 210 and the leaf device 220 existing in various home networks. For example, when the hub device 210 and the leaf device 220 registered in the IoT management server 240 are connected or disconnected, the hub device 210 and/or the leaf device 220 may transmit connection or disconnection information to the IoT management server 240, and the IoT management server 240 may store information on which hub device 210 is connected to the leaf device 220 and which service is being executed in real time.

According to various embodiments, the automation manager 248 may perform a function of storing an automation rule in the database and providing the automation rule to the hub device 210 of the local network. For example, when the hub device 210 is on board and/or is upgraded, the automation manager 248 may provide rule information for devices located in the local network to the hub device 210, and the hub device 210 may store a local rule database.

According to various embodiments, when the leaf device 220 is connected to a specific edge device (for example, the tablet PC 111 of FIG. 1) to perform the edge computing service and then is disconnected from the corresponding edge device according to a handover event and is connected to another edge device (for example, the TV 112 of FIG. 1) to perform the edge computing service, the IoT management server 240 may update connection information between the hub device 210 changed according to the handover event and the leaf device 220.

According to various embodiments, the IoT hub server 250 may support a cloud computing platform and provide data required for the connection between the leaf device 220 and the hub device 210 within the cloud environment. The IoT hub server 250 may include an IoT hub 252 and a module registry 254.

According to various embodiments, the module registry 254 may be a storage space of modules (for example, the device module 219 and the service module 218) required for performing the edge computing service.

According to various embodiments, the IoT hub 252 may maintain the connection with the hub device 210, provide modules stored in the module registry 254 to the hub device 210, and maintain information on modules installed in various hub devices 210.

According to various embodiments, the hub device 210 (for example, the edge device 110 of FIG. 1) may be a device having a unique function of the device such as a TV, a tablet PC, or a laptop PC and including a hardware and/or software component (for example, an edge runtime or a basic module) for the edge computing service. The edge computing service may be performed through hardware and/or software resources at least partially simultaneously with the performance of the unique function or during an idle time in which the unique function is not performed.

According to various embodiments, the hub device 210 may include an interface 212 for communication with the cloud (for example, the IoT management server 240 and the IoT hub server 250), an operating system (OS) 214, an edge runtime 216, a service module 218, and a device module 219. For example, the hub device 210 may need a hardware condition (central processing unit (CPU) performance) for executing the operating system 214 and may include a real time operating system (RTOS).

Through a processing process or a software upgrade of the hub device 210, the edge runtime 216 and the basic module for edge computing may be installed in the hub device 210. The edge runtime 216 may include a daemon program for an interwork with the IoT server, and the basic module may be configured as a container as a program required for communication with the IoT server. For example, the basic module may be a container installed in an environment of the edge runtime 216.

According to various embodiments, when the hub device 210 is connected to a specific leaf device 220, the hub device 210 may receive at least one module for performing the edge computing service from the IoT hub server 250 and install the same. For example, at least one module may be determined according to the type of the connected leaf device 220 and/or the type of the service which can be performed, and may include the device module 219 corresponding to the corresponding leaf device 220 and/or the service module 218 corresponding to the type of the service to be performed. When the hub device 210 is connected to a plurality of leaf devices 220, the device modules 219 (for example, device module #1 219a and device module #2 219b) corresponding to the respective leaf devices 220 may be installed. The hub device 210 may execute the edge runtime 216 during a provision process to be connected to the IoT hub server 250, and the at least one module may be additionally installed and executed according to the type of the leaf device 220. The hub device 210 may activate or deactivate the edge mode according to a command received from the IoT hub server 250 or the IoT management server 240. When the edge mode is deactivated, the hub device 210 may perform only the unique function (for example, an image output function of the TV), and the device module 219 and the service module 218 may not be executed.

According to various embodiments, the leaf device 220 (for example, the leaf device 120 of FIG. 1) may transmit data acquired using the sensor to the connected hub device 210 or the cloud network (for example, the IoT management server 240 or the IoT hub server 250). For example, an Internet protocol (IP) camera operating as the leaf device 220 is connected to the hub device 210 and may transmit image streaming to the hub device 210.

According to various embodiments, the user device 230 may be a device capable of executing various applications like a smartphone or a tablet PC and including a device for displaying a user interface (UI). The user device 230 may install and/or execute an application for the edge computing service and receive content and a notification generated by the leaf device 220 through the corresponding application. When the hub device 210 and the leaf device 220 are connected, the content or notification generated by the leaf device 220 may be transmitted to the user device 230 through the hub device 210.

According to various embodiments, functions of the IoT hub server 250 and the IoT management server 240 may be performed by one server device (for example, the IoT server 260 of FIG. 2B). For example, referring to FIG. 2B, the IoT server 260 may include an IoT hub 261 (for example, the IoT hub 252 of FIG. 2A), a module registry 262 (for example, the module registry 254 of FIG. 2A), a provision manager 263 (for example, the provision manager 242 of FIG. 2A), a module manager 264 (for example, the module manager 244 of FIG. 2A), and an edge-leaf manager 265 (for example, the edge-leaf manager 246 of FIG. 2A) which are the elements of the above-described IoT hub server 250 and IoT management server 240.

Alternatively, the functions may be performed by three or more of a plurality of server devices. For example, the respective elements of the IoT hub server 250 and the IoT management server 240 of FIG. 2A may be distributed by three or more of a plurality of server devices existing in the network, or some operations performed by the respective elements may be distributively performed by several server devices.

Figure 3:
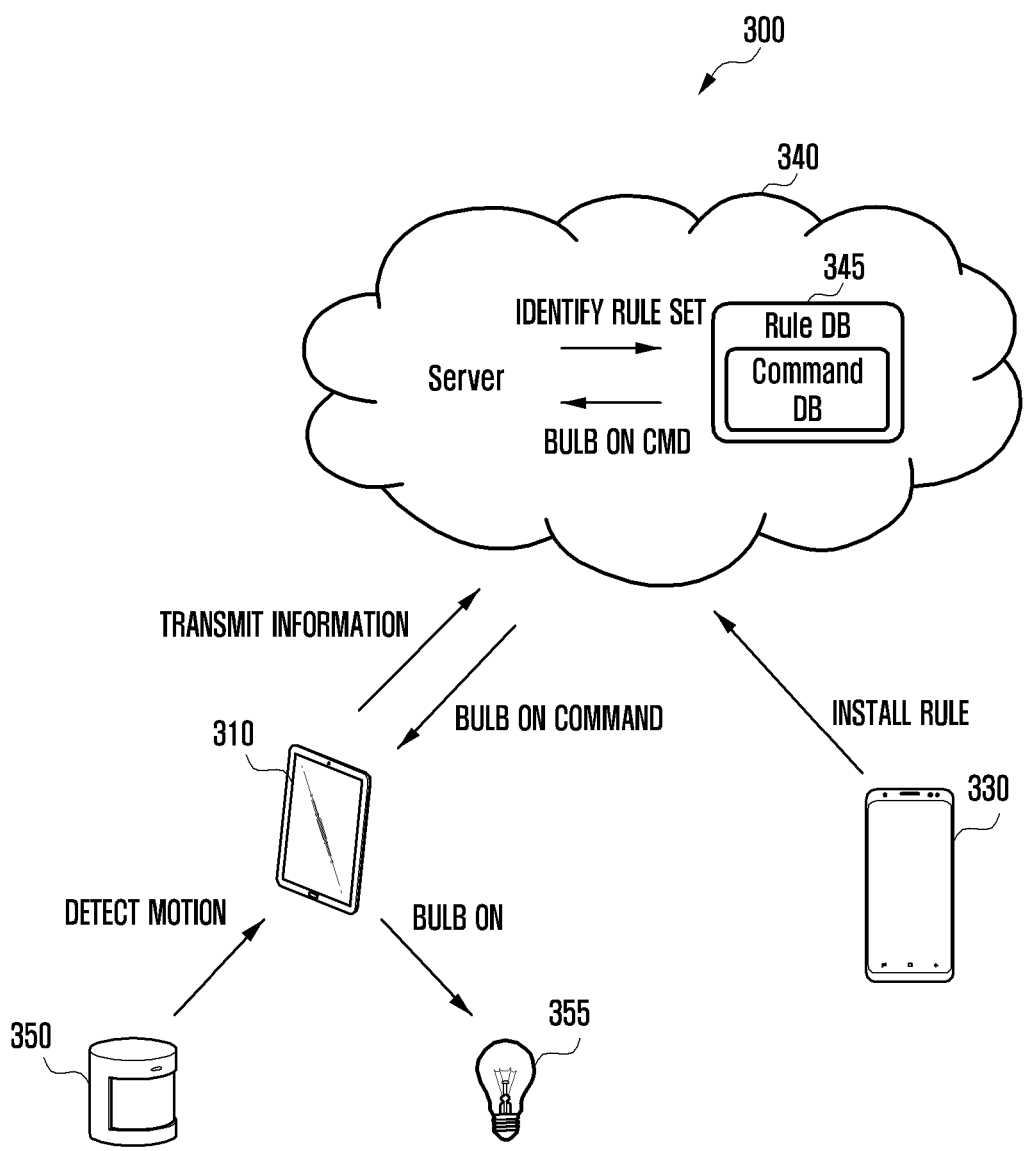
FIG. 3 illustrates an operation of each device for processing cloud-based event automation according to an embodiment of the disclosure.

FIG. 3 illustrates an operation of each device for cloud-based event automation processing according to an embodiment of the disclosure.

In the disclosure, the automation technology is a technology that makes respective devices interact with each other to operate according to a preset condition even through there is no user command, and the automation rule (hereinafter, referred to as the rule) may be a rule including a trigger indicating a start point of execution of the installed rule when a specific condition is satisfied, an actor indicating an operation actually executed when the trigger is generated, and information on which operation is to be performed on the basis of a determination of the operation as a trigger.

Referring to FIG. 3, the IoT system 300 may include a hub device 310, a user device 330, a cloud server 340, a trigger device 350, and an actor device 355. Hereinafter, the case in which a specific device of the IoT system functions as one device is described, but one device may operate as a device having another function, for example, a motion sensor may operate as the trigger device 350 and/or the actor device 355.

According to various embodiments, the trigger device 350 may be a device detecting a specific event in an IoT environment, and the actor device 355 may be a device performing a specific operation in response to the corresponding event. For example, a motion sensor (for example, the motion sensor 123c of FIG. 1) corresponding to the trigger device 350 may detect motion of a surrounding object and generate a trigger event, and a bulb (for example, the bulb 123a of FIG. 1) corresponding to the actor device 355 may be turn on/off when the motion sensor detects motion.

According to various embodiments, the cloud server 340 may store a rule database 345 related to IoT automation. The rule stored in the rule database 345 may map and store at least one of a trigger event (for example, motion detection), a rule set corresponding to the trigger event, a destination, or an action command.

According to various embodiments, the hub device 310 may be connected to the trigger device 350 and the actor device 355 through short-range wireless communication in the local network and may communicate with the cloud server 340 through a public data network (PDN). The hub device 310 may perform a unique device function (for example, an image output function of the TV) and process an operation required by an automation service through hardware and/or software resources simultaneously with at least partially the performance of the unique function or during an idle time in which the unique function is not performed.

According to various embodiments, the user device 330 may provide various user interfaces related to the automation service through an application. The user device 330 may configure an automation rule on the basis of a user input into the application. For example, the user device 330 may select the trigger device 350 according to a user input, a trigger event which can be detected by the trigger device 350, an operation to be performed according to the corresponding trigger event, the actor device 355 capable of performing the corresponding operation, and the hub device 310 which can be connected to the trigger device 350 and/or the actor device 355. The user device 330 may transmit the configured automation rule to the cloud server 340, and the cloud server 340 may update the rule database 345 according to information received from the user device 330.

Hereinafter, an operation of each device when a trigger event is detected by the trigger device 350 (for example, a motion sensor) in the state in which a rule is defined by the user device 330 and stored in the rule database 345 of the cloud server 340 is described with reference to FIG. 3.

According to various embodiments, when motion of an object is detected, the trigger device 350 may generate a trigger event and transfer motion detection information to the connected hub device 310. The hub device 310 may transmit the motion detection information received from the trigger device 350 to the cloud server 340 through the network.

According to various embodiments, the cloud server 340 may identify a rule set mapped with motion detection information in the rule database 345 and identify an action command defined in the corresponding rule set. For example, the action command corresponding to the motion detection may be turning on of the bulb.

According to various embodiments, the cloud server 340 may transmit the identified action command to the hub device 310. The hub device 310 may transmit the received action command to the actor device 355, and the actor device 355 may turn on the bulb in response to reception of the action command.

FIG. 3 has described the embodiment of providing the cloud-based automation service using the rule database 345 of the cloud server 340, but the operation defined in the automation rule may be performed by communication between devices within the local network without depending on the cloud server 340 when a trigger event is generated in various embodiments of the disclosure.

Figure 4:
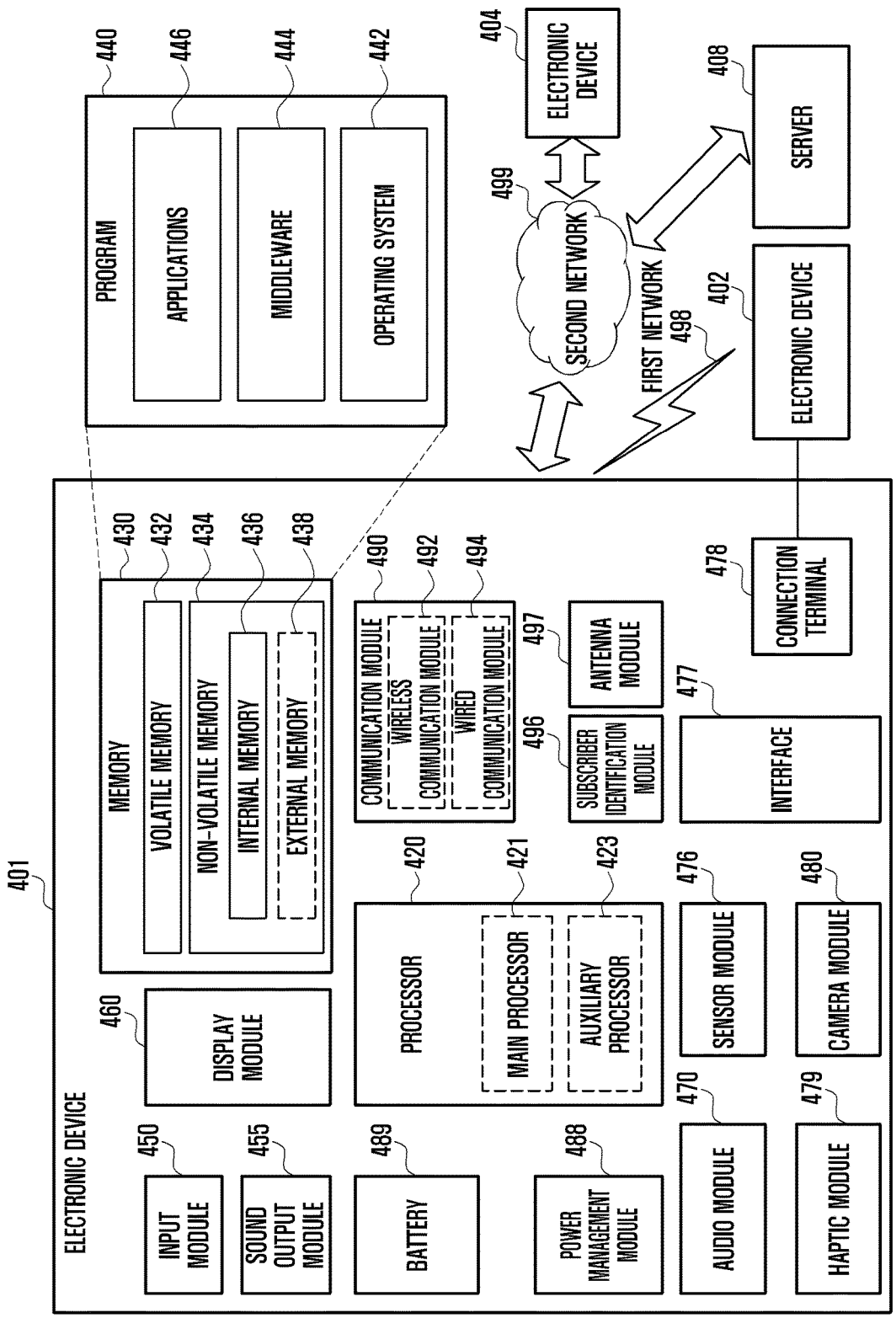
FIG. 4 is a block diagram of a user device according to an embodiment of the disclosure.

FIG. 4 is a block diagram illustrating a user device according to an embodiment of the disclosure.

FIG. 4 is a block diagram illustrating user device 401 (e.g., a user device 130 of FIG. 1, a user device 230 of FIG. 2A, or a user device 330 of FIG. 3) in a network environment according to various embodiments.

Referring to FIG. 4, the user device 401 in the network environment may communicate with an external electronic device 402 via a first network 498 (e.g., a short-range wireless communication network), or at least one of an external electronic device 404 or a server 408 via a second network 499 (e.g., a long-range wireless communication network). According to another embodiment, the user device 401 may communicate with the external electronic device 404 via the server 408. According to yet another embodiment, the user device 401 may include a processor 420, memory 430, an input module 450, a sound output module 455, a display module 460, an audio module 470, a sensor module 476, an interface 477, a connection terminal 478, a haptic module 479, a camera module 480, a power management module 488, a battery 489, a communication module 490, a subscriber identification module (SIM) 496, or an antenna module 497. In some embodiments, at least one of the components (e.g., the connection terminal 478) may be omitted from the user device 401, or one or more other components may be added in the user device 401. In some embodiments, some of the components (e.g., the sensor module 476, the camera module 480, or the antenna module 497) may be implemented as a single component (e.g., the display module 460).

The processor 420 may execute, for example, software (e.g., a program 440) to control at least one other component (e.g., a hardware or software component) of the user device 401 coupled with the processor 420, and may perform various data processing or computation. According to one embodiment, as at least part of the data processing or computation, the processor 420 may store a command or data received from another component (e.g., the sensor module 476 or the communication module 490) in volatile memory 432, process the command or the data stored in the volatile memory 432, and store resulting data in non-volatile memory 434. According to a further embodiment, the processor 420 may include a main processor 421 (e.g., a central processing unit (CPU) or an application processor (AP)), or an auxiliary processor 423 (e.g., a graphics processing unit (GPU), a neural processing unit (NPU), an image signal processor (ISP), a sensor hub processor, or a communication processor (CP)) that is operable independently from, or in conjunction with, the main processor 421. For example, when the user device 401 includes the main processor 421 and the auxiliary processor 423, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display module 460, the sensor module 476, or the communication module 490) among the components of the user device 401, instead of the main processor 421 while the main processor 421 is in an inactive (e.g., sleep) state, or together with the main processor 421 while the main processor 421 is in an active state (e.g., executing an application). According to still another embodiment, the auxiliary processor 423 (e.g., an image signal processor or a communication processor) may be implemented as part of another component (e.g., the camera module 480 or the communication module 490) functionally related to the auxiliary processor 423. According to an embodiment, the auxiliary processor 423 (e.g., the neural processing unit) may include a hardware structure specified for artificial intelligence model processing. An artificial intelligence model may be generated by machine learning. Such learning may be performed, e.g., by the user device 401 where the artificial intelligence is performed or via a separate server (e.g., the server 408). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 430 may store various data used by at least one component (e.g., the processor 420 or the sensor module 476) of the user device 401. The various data may include, for example, software (e.g., the program 440) and input data or output data for a command related thereto. The memory 430 may include the volatile memory 432 or the non-volatile memory 434.

The program 440 may be stored in the memory 430 as software, and may include, for example, an operating system (OS) 442, middleware 444, or an application 446.

The input module 450 may receive a command or data to be used by another component (e.g., the processor 420) of the user device 401, from the outside (e.g., a user) of the user device 401. The input module 450 may include, for example, a microphone, a mouse, a keyboard, a key (e.g., a button), or a digital pen (e.g., a stylus pen).

The sound output module 455 may output sound signals to the outside of the user device 401. The sound output module 455 may include, for example, a speaker or a receiver. The speaker may be used for general purposes, such as playing multimedia or playing record. The receiver may be used for receiving incoming calls. According to another embodiment, the receiver may be implemented as separate from, or as part of the speaker.

The display module 460 may visually provide information to the outside (e.g., a user) of the user device 401. The display module 460 may include, for example, a display, a hologram device, or a projector and control circuitry to control a corresponding one of the display, hologram device, and projector. According to yet another embodiment, the display module 460 may include a touch sensor adapted to detect a touch, or a pressure sensor adapted to measure the intensity of force incurred by the touch.

The audio module 470 may convert a sound into an electrical signal and vice versa. According to a further embodiment, the audio module 470 may obtain the sound via the input module 450, or output the sound via the sound output module 455 or a headphone of an external electronic device (e.g., an external electronic device 402) directly (e.g., wiredly) or wirelessly coupled with the user device 401.

The sensor module 476 may detect an operational state (e.g., power or temperature) of the user device 401 or an environmental state (e.g., a state of a user) external to the user device 401, and then generate an electrical signal or data value corresponding to the detected state. According to still another embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the user device 401 to be coupled with the external electronic device (e.g., the external electronic device 402) directly (e.g., wiredly) or wirelessly. According to an embodiment, the interface 477 may include, for example, a high definition multimedia interface (HDMI), a universal serial bus (USB) interface, a secure digital (SD) card interface, or an audio interface.

A connection terminal 478 may include a connector via which the user device 401 may be physically connected with the external electronic device (e.g., the external electronic device 402). According to another embodiment, the connection terminal 478 may include, for example, a HDMI connector, a USB connector, an SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to yet another embodiment, the haptic module 479 may include, for example, a motor, a piezoelectric element, or an electric stimulator.

The camera module 480 may capture a still image or moving images. According to a further embodiment, the camera module 480 may include one or more lenses, image sensors, image signal processors, or flashes.

The power management module 488 may manage power supplied to the user device 401. According to one embodiment, the power management module 488 may be implemented as at least part of, for example, a power management integrated circuit (PMIC).

The battery 489 may supply power to at least one component of the user device 401. According to still another embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the user device 401 and the external electronic device (e.g., the external electronic device 402, the external electronic device 404, or the server 408) and performing communication via the established communication channel. The communication module 490 may include one or more communication processors that are operable independently from the processor 420 (e.g., the application processor (AP)) and supports a direct (e.g., wired) communication or a wireless communication.

According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A corresponding one of these communication modules may communicate with the external electronic device 404 via the first network 498 (e.g., a short-range communication network, such as Bluetooth™ wireless-fidelity (Wi-Fi) direct, or infrared data association (IrDA)) or the second network 499 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 492 may identify and authenticate the user device 401 in a communication network, such as the first network 498 or the second network 499, using subscriber information (e.g., international mobile subscriber identity (IMSI)) stored in the subscriber identification module 496.

The wireless communication module 492 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 492 may support a high-frequency band (e.g., the millimeter wave (mmWave) band) to achieve, e.g., a high data transmission rate. The wireless communication module 492 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 492 may support various requirements specified in the user device 401, an external electronic device (e.g., the external electronic device 404), or a network system (e.g., the second network 499). According to another embodiment, the wireless communication module 492 may support a peak data rate (e.g., 20 gigabits per second (Gbps) or more) for implementing eMBB, loss coverage (e.g., 464 dB or less) for implementing mMTC, or U-plane latency (e.g., 0.5 ms or less for each of downlink (DL) and uplink (UL), or a round trip of 4 ms or less) for implementing URLLC.

The antenna module 497 may transmit or receive a signal or power to or from the outside (e.g., the external electronic device) of the user device 401. According to yet another embodiment, the antenna module 497 may include an antenna including a radiating element composed of a conductive material or a conductive pattern formed in or on a substrate (e.g., a printed circuit board (PCB)). According to a further embodiment, the antenna module 497 may include a plurality of antennas (e.g., array antennas). In such a case, at least one antenna appropriate for a communication scheme used in the communication network, such as the first network 498 or the second network 499, may be selected, for example, by the communication module 490 (e.g., the wireless communication module 492) from the plurality of antennas. The signal or the power may then be transmitted or received between the communication module 490 and the external electronic device via the selected at least one antenna. According to still another embodiment, another component (e.g., a radio frequency integrated circuit (RFIC)) other than the radiating element may be additionally formed as part of the antenna module 497.

According to various embodiments, the antenna module 497 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to another embodiment, commands or data may be transmitted or received between the user device 401 and the external electronic device 404 via the server 408 coupled with the second network 499. Each of the external electronic devices 402 or 404 may be a device of a same type as, or a different type, from the user device 401. According to yet another embodiment, all or some of operations to be executed at the user device 401 may be executed at one or more of the external electronic devices 402 or 404 or the server 408. For example, if the user device 401 should perform a function or a service automatically, or in response to a request from a user or another device, the user device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the user device 401. The user device 401 may provide the outcome, with or without further processing of the outcome, as at least part of a reply to the request. To that end, a cloud computing, distributed computing, mobile edge computing (MEC), or client-server computing technology may be used, for example. The user device 401 may provide ultra low-latency services using, e.g., distributed computing or mobile edge computing. In another embodiment, the external electronic device 404 may include an internet-of-things (IoT) device. The server 408 may be an intelligent server using machine learning and/or a neural network. According to a further embodiment, the external electronic device 404 or the server 408 may be included in the second network 499. The user device 401 may be applied to intelligent services (e.g., smart home, smart city, smart car, or healthcare) based on 5G communication technology or IoT-related technology.

Figure 5:
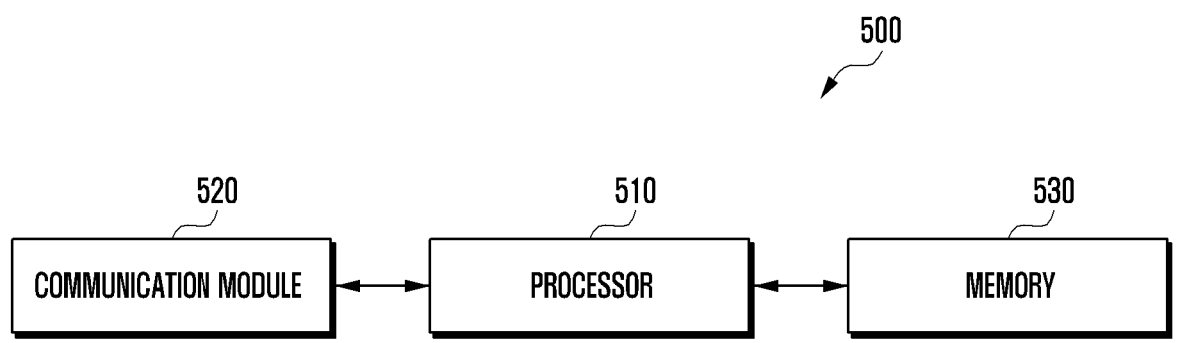
FIG. 5 is a block diagram of a hub device according to an embodiment of the disclosure.

FIG. 5 is a block diagram of a hub device 500 according to an embodiment of the disclosure.

Referring to FIG. 5, the hub device 500 (for example, the hub device 110 of FIG. 1, the hub device 210 of FIG. 2A, or the hub device 310 of FIG. 3) may include a processor 510, a communication module 520, and a memory 530, and various embodiments of the disclosure can be implemented even though some of the illustrated elements are omitted or replaced.

There may be a plurality of hub devices 500 in the IoT system (for example, the IoT system 100 of FIG. 1, the IoT system 200 of FIG. 2A, or the IoT system 300 of FIG. 3) according to various embodiments, and respective hub devices 500 may be different types of devices. For example, the hub device 500 may be implemented as a device such as a TV, a tablet PC, or a laptop PC. Hereinafter, description of characteristics for executing a unique device function by the hub device 500 is omitted, and only operations required for operating the hub device 500 of the automation service in the IoT system are described.

According to various embodiments, the IoT system may include a plurality of hub devices 500. For example, in connection with execution of a specific rule, all of a trigger device (for example, the trigger device 350 of FIG. 3) and an actor device (for example, the actor device 355 of FIG. 3) may be connected to one hub device 500, and in connection with another rule, the trigger device may be connected to a first hub device and the actor device may be connected to a second hub device.

According to various embodiments, the communication module 520 may support communication with an external device through a wireless network. The communication module 520 may be connected with a device (for example, the trigger device, the actor device, another hub device, or an access point (AP) within the local network through short-range wireless communication such as near filed communication (NFC), Bluetooth, Bluetooth low energy (BLE), WiFi direct, a mesh network (for example, Zigbee or Z-wave), and/or an ultra-wideband, and connected to the cloud server or the user device through cellular communication such as a 4G network and/or a 5G network (for example, standalone (SA) or non-standalone (NSA)) other than the short-range wireless communication.

According to various embodiments, the processor 510 is a configuration capable of processing calculations or data related to the control and/or communication of respective elements of the hub device 500 and may be operatively, functionally, and/or electrically connected to each element of the hub device 500 such as the communication module 520 or the memory 530.

According to various embodiments, there is no limitation in calculations and data processing functions which can be implemented within the hub device 500 by the processor 510, but an operation in which the hub device 500 receives rule information from the cloud server and stores and updates the local rule database and an operation of transmitting information related to a trigger event to another device according to a trigger event will be described hereinafter in detail.

According to various embodiments, the memory 530 may include a volatile memory and/or a nonvolatile memory, and may temporarily and/or permanently store various pieces of data used by at least one element (for example, the processor 510) of the hub device 500. The memory 530 may store various instructions that can be executed by the processor 510. The instructions may include various control commands including arithmetic and logical operations, data movement, and input/output which can be recognized by the processor 510.

According to various embodiments, the memory 530 may receive rule information according to the control of the processor 510 and store the rule information in the local rule database.

According to another embodiment, the hub device 500 may pre-install all rules configured in connection with devices located in the local network in the local rule database. For example, information on all rules may be stored in the local rule database during a manufacturing step of the hub device 500. Alternatively, the hub device 500 may download information on devices located in the local network from the cloud server at a time point (onboarding) at which the hub device 500 is initially registered in the cloud server and store the information in the local rule database. Alternatively, when being upgraded (for example, firmware over the air (FOTA)), the hub device 500 may download rule information from the cloud server and install or update the local rule database.

When the storage capacity of the memory 530 is sufficient and information on predefined rules and devices have been classified, the hub device 500 may pre-install all the rules in the database, in which case the automation service can be possible for all types of devices and rules. Further, the automation service can be executed through analysis of a packet transmitted from each device after the automation rule is installed.

According to another embodiment, when a new rule is needed, the hub device 500 may make a request for the rule to the cloud server and receive and install rule information. For example, when the storage capacity of the memory 530 of the hub device 500 is not sufficient or information required for the rule is continuously updated, it may be difficult to install in advance all of the rule information. Accordingly, as described in the embodiment, when a request for the automation rule is made by another device (for example, the trigger device, the actor device, another hub device 500, or the user device) within the local network, a request for rule information required for the corresponding request may be made to the cloud server, the rule information may be downloaded and installed, and the rule corresponding to the corresponding request may be conducted. According to yet another embodiment, when another device (for example, the trigger device, the actor device, another hub device, or the user device) is included in the local network, the hub device 500 may receive information on another device from another device or the cloud server and install the same.

According to another embodiment, the hub device 500 may directly install a rule designed in person by the user in the local rule database. For example, an API available by the hub device 500 may be provided to the user and the user may be allowed to directly generate the rule through the user interface. In this case, rule information generated by the user may be stored in the cloud server, and the hub device 500 may download the same from the cloud server and store the same in the memory 530 or may receive the same from the user device through direct communication with the user device in the local network and store the same in the memory 530.

According to various embodiments, when new rule information is received from the cloud server and/or the user device after the local rule database is installed, the processor 510 may update information stored in the local rule database.

According to various embodiments, the processor 510 may receive a trigger event from the trigger device (or a first external device) through the communication module 520 in the state in which the local rule database is stored in the memory 530. The trigger device may transmit an identity (ID) of the trigger device and information on the generated trigger event to the hub device 500. For example, when the trigger event is generated, the trigger device may be configured to transmit the ID of the trigger device and the information on the generated trigger event to the predetermined hub device 500.

According to various embodiments, the processor 510 may identify rule information mapped to the received trigger event in the local rule data and transmit information related to the trigger event to another device (for example, another hub device, the actor device, or the cloud server) through the communication module 520 on the basis of the identified rule information.

According to a further embodiment, both the trigger device and the actor device may be connected to the hub device 500, and the local rule database may include a trigger event, an action command indicating an operation to be executed in response to the trigger event, and a command database that maps and stores the actor device to execute the action command.

According to the embodiment, when receiving a trigger event (for example, motion detection) from the trigger (for example, the motion sensor), the hub device 500 may identify an action command (for example, turning on the bulb) mapped to the corresponding trigger event in the command database and the actor device (for example, the bulb) to execute the action command. The hub device 500 may transmit the action command to the corresponding actor device, and the actor device may execute the operation corresponding to the action command. The embodiment is described in more detail with reference to FIG. 7.

According to various embodiments, rule information may be distributed to and installed in a plurality of hub devices 500. For example, a trigger rule may be installed in a first hub device connected to the trigger device and an actor rule may be installed in a second hub device connected to the actor device.

Rule information which the first hub device receives from the cloud server and stores in the local rule database of the memory 530 and the operation of the processor 510 when the trigger event is generated according thereto may be divided into various embodiments below.

According to a first embodiment, the first hub device may store a routing database of mapping and storing a trigger event and a destination to bypass the trigger event in the local rule database. For example, when a trigger event is generated by a specific trigger device, the routing database may define a rule of mapping identification (for example, a universal unique identifier (UUID) or an IP address) of a second hub device to transmit the corresponding trigger event.

The second hub device according to the embodiment may store a command database of mapping and storing a trigger event, an action command indicating the operation to be executed when the trigger event is generated, and an actor device to execute the action command in the local rule database.

According to the embodiment, when a trigger event (for example, motion information detection) is received from the trigger device (for example, the motion sensor), the processor 510 may identify the second hub device mapped to the corresponding trigger event in the routing database and transmit the trigger event to the identified second hub device in the local network. The second hub device may identify an action command and an actor device mapped to the trigger event in the command database and transmit the identified action command to the actor device. The actor device may perform the operation (for example, turning on the bulb) according to the received action command. The first embodiment is described in more detail with reference to FIG. 9.

According to a second embodiment, the first hub device may store a destination database of mapping and storing trigger events and rule sets defining rules conducted when the trigger events are generated in the local rule database. The rule set may have a unique ID, and the destination database may map and store identification information of another hub device 500 capable of processing each rule set.

In the embodiment, the second hub device may store a command database of mapping and storing a trigger event, an action command indicating the operation to be executed when the trigger event is generated, and an actor device to execute the action command in the local rule database.

According to the embodiment, when a trigger event is received from the trigger device, the processor 510 may identify a rule set mapped to the corresponding trigger event and the second hub device capable of processing the corresponding rule set in the destination database and transmit information on the corresponding rule set to the identified second hub device. The second hub device may identify the corresponding rule set in the command database and identify the action command and the actor device in the rule set. The second hub device may transmit the action command to the actor device, and the actor device may perform the operation according to the received action command. The second embodiment will be described in more detail with reference to FIG. 8.

According to a third embodiment, the first hub device may store a command database of mapping a trigger event and an action command indicating the operation to be performed in response to the trigger event and a destination database of mapping and storing information on an actor device to execute the action command in the local rule database.

In the embodiment, the second hub device may not include the local rule database.

According to the embodiment, when the trigger event is received from the trigger device, the first hub device may identify an action command mapped to the corresponding trigger event in the command database and identify the second hub device to transmit the action command in the destination database. The first hub device may transmit the action command and information on the actor device to the identified second hub device. The second hub device may bypass the action command to the corresponding actor device. The third embodiment will be described in more detail with reference to FIG. 10.

According to various embodiments, when there is no external device to transmit information related to the trigger event in the local rule database or the connection with the external device is not possible, the processor 510 may transmit the information related to the trigger event to the cloud server. In this case, the could-based automation service described with reference to FIG. 3 may be performed.

In various embodiments, a connection scheme with another device within the local network may be various.

According to still another embodiment, the hub device 500 may be directly connected to another device in the local network. For example, the hub device 500 and another hub device, or the hub device 500 and the trigger device (or the actor device) may be directly connected through short-range wireless communication. Further, when each device is connected to a mesh network and is aware that another device exists in the mesh network, they may perform direct communication through the mesh network. In the embodiment, the hub device 500 may directly generate and store rule information and/or exchange rule information with another connected device.

According to an embodiment, devices (for example, the trigger device and the actor device) within the local network may be connected through one hub device 500. For example, when various devices are connected to one hub device 500 through wireless communication or wired communication or when the hub device 500 has a device list, respective devices may communicate through the hub device 500. In this case, the automation rule may be installed in the corresponding hub device 500, and the hub device 500 may analyze a packet received from the trigger device to trigger the rule and transmit the action command corresponding thereto to the actor device.

According to another embodiment, the first hub device and the second hub device may be connected to each other within the local network, the trigger device may be connected to the first hub device, and the actor device may be connected to the second hub device. In this case, the rule information may be divided into a trigger rule and an actor rule and may be installed in the first hub device and the second hub device, respectively. Alternatively, the rule information may be installed only in the first hub device connected to the trigger device, and the second hub device may bypass the action command received from the first hub device to the actor device.

In the embodiment, a connection scheme between the first hub device and the second hub device may be various. For example, when the first hub device and the second hub device are connected to the same switch, they may be directly connected through a local LAN, may be connected through Wi-Fi direct or a mesh network, or may be connected to each other through low energy communication such as Zigbee or Z-wave.

According to yet another embodiment, the first hub device connected to the trigger device and the second hub device connected to the actor device may be connected through the same access point (AP). In this case, since the first hub device and the second hub device are connected to the same AP, mutual communication may be possible without separate work. Alternatively, the first hub device and the second hub device may exchange an IP address of each other through a separate process. Alternatively, the first hub device and/or the second hub device may upload its own IP address to the cloud server when being connected to the cloud server and may acquire an IP address of another device within the same local network from the cloud server.

According to a further embodiment, the first hub device connected to the trigger device and the second hub device connected to the actor device may be connected through the local network. For example, the first hub device and the second hub device may be connected to different APs, or may be connected to different switches and the corresponding switches may be connected through a router, or IP bands of networks to which the respective hub devices belong may be different. In the embodiment, tunneling may be need for communication between the first hub device and the second hub device, and a right to access to the AP or the router may be needed as necessary.

According to still another embodiment, the first hub device connected to the trigger device and the second hub device connected to the actor device may be connected through a long-range communication network (wide area network (WAN)). For example, when the first hub device and the second hub device used by the same user are far away from each other like the office and home, the WAN may acquire a counterpart's network address and make the connection.

According to various embodiments, the connection scheme may be selected according to a function of each device within the local network.

According to an embodiment, two hub devices 500 may identify whether they have the same IP band and in the case of the same IP band, may exchange IP addresses for the direct connection. When the two hub devices 500 have different IP bands, tunneling may be attempted.

According to another embodiment, in the case of the connection between the hub device 500 and the trigger device (or the actor device), if the trigger device is first connected to the hub device 500, direct communication may be attempted. When the trigger device is not connected to the corresponding hub device 500, the hub device 500 may search for another hub device connected to the trigger device (or the actor device) and install a result by using communication between the corresponding hub devices.

According to yet another embodiment, in the case of the connection between the trigger device and the actor device, it may be identified whether the two devices are connected to the same hub device 500 and, when they are connected to the same hub device 500, rule information may be installed in the corresponding hub device 500. When the trigger device and the actor device are connected to different hub devices 500, the connection may be attempted after a communication function between the hub devices 500 is checked.

According to various embodiments, the hub device 500 having an installed rule may periodically attempt communication with another device (for example, the trigger device, the actor device, or another hub device) defined in the corresponding rule. When a predetermined number or (for example, two) more of responses do not exist during the periodic communication process, the hub device 500 may report the same to the cloud server, cancel the previous connection, and initiate the connection procedure again.

Figure 6:
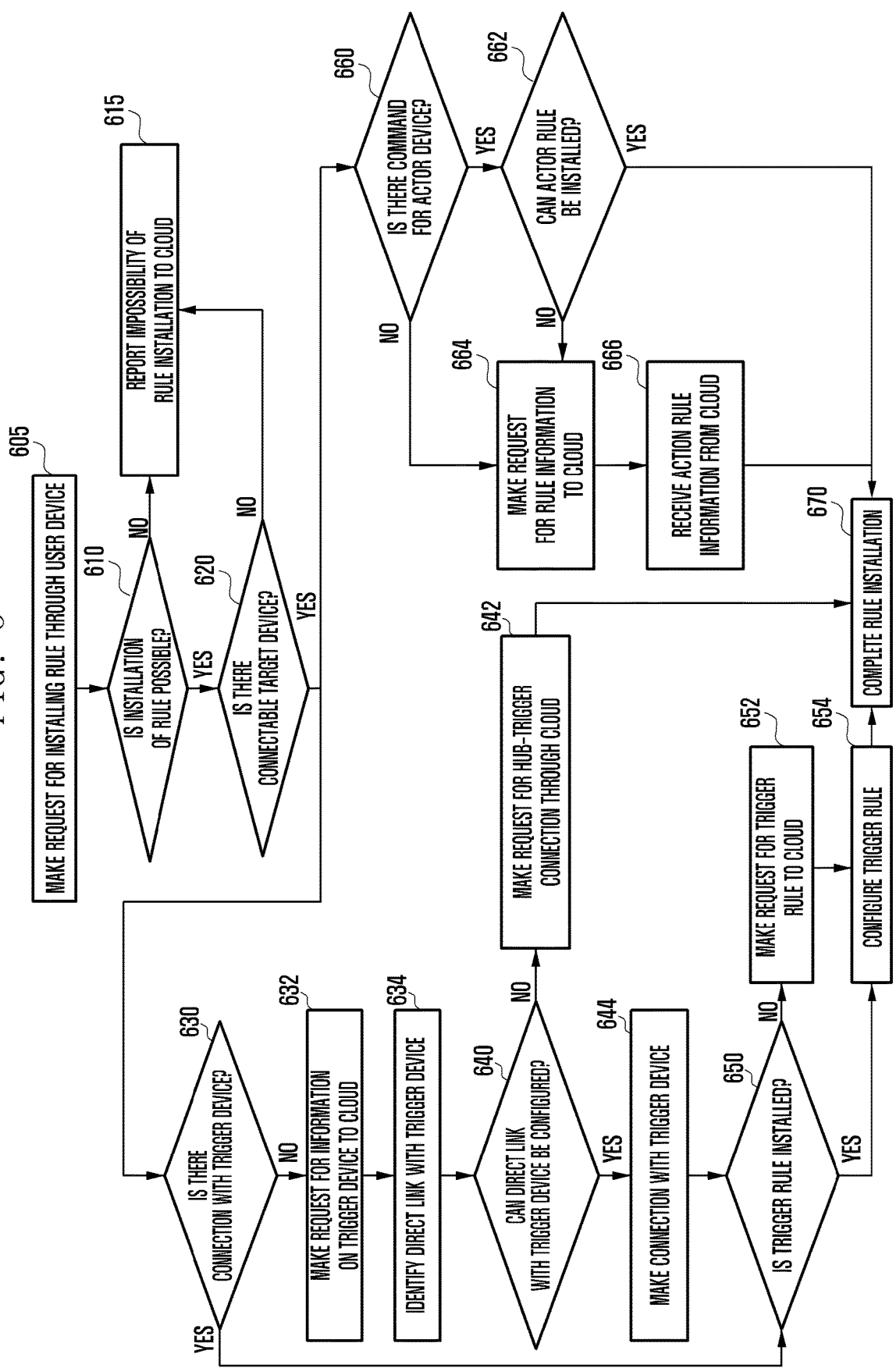
FIG. 6 is a flowchart illustrating a process in which the hub device installs an automation rule according to an embodiment of the disclosure.

FIG. 6 is a flowchart illustrating a process in which the hub device installs an automation rule according to an embodiment of the disclosure.

The illustrated method may be performed by the above-described hub device (for example, the hub device 500 of FIG. 5), and some of the technical features described above may be omitted.

According to various embodiments, in operation 605, the hub device may receive a rule set installation request. The rule set installation request may be triggered by an application of a user device (for example, the user device 330 of FIG. 3 or the user device 401 of FIG. 4), and the rule set may be transmitted from a cloud server (for example, the cloud server 340 of FIG. 3).

According to various embodiments, in operation 610, the hub device may identify whether the rule can be installed. According to various embodiments, when the rule cannot be installed, for example, when resources of a processor (for example, the processor 510 of FIG. 5) and/or a memory (for example, the memory 530 of FIG. 5) for installing the rule set are not sufficient, the hub device may report impossibility of rule installation to the cloud server in operation 615.

According to various embodiments, in operation 620, the hub device may identify whether there is a connectable target device in the local network. For example, the hub device may search the local network to identify whether there is a connectable target device. The target device may include a trigger device (for example, a motion sensor)

and/or an actor device (for example, a bulb) included in the rule set received from the cloud server. The hub device may be connected to only the trigger device, only the actor device, or both the trigger device and the actor device. Operation 630 and the following operations (for example, operations 630 to 645 and operation 670) may be performed when the hub device can be connected to the trigger device, operation 660 and the following operations (for example, operations 660 to 666 and operation 670) may be performed when the hub device can be connected to the actor device, and operation 630 and the following operations (for example, operations 630 to 666 and operation 670) may be performed when the hub device can be connected to both the trigger device and the actor device.

According to various embodiments, in operation 630, the hub device may identify whether the hub device is currently connected to the trigger device.

According to various embodiments, when the hub device is not currently connected to the trigger device, the hub device may make a request for information on the trigger device to the cloud server in operation 632 and receive a direct link with the trigger device from the cloud server in operation 634.

According to various embodiments, in operation 640, the hub device may identify whether the connection to the trigger device through the direct link is possible. According to various embodiments, when the connection is not possible, the hub device may make a request for the connection with the trigger device through the cloud server in operation 642. According to various embodiments, when the connection is possible, the hub device may make the connection with the trigger device in operation 644.

According to various embodiments, when the connection with the trigger device is established, the hub device may identify whether a trigger rule corresponding to the connected trigger device is installed in operation 650. According to various embodiments, when the trigger rule is not installed, the hub device may make a request for transmitting the trigger rule corresponding to the corresponding trigger device to the cloud server in operation 652.

According to various embodiments, in operation 654, the hub device may store the trigger rule received from the cloud server in a local rule database of the memory.

According to various embodiments, in operation 660, the hub device may identify whether there is a command which the connected actor device can execute. For example, the hub device may identify whether a command for the actor device required for conducting the rule is stored in the hub device. When there is the command which can be executed, the hub device may identify whether the hub device can install an actor rule in operation 662. When the hub device can install the actor rule, the hub device may transfer the actor rule stored in the hub device to the actor device and the actor device may receive and install the corresponding actor rule. Unlike this, when the command which can be executed by the hub device is not stored, the hub device may make a request for rule information to the cloud server in operation 664, receive actor rule information from the cloud server in operation 666, and store the same in the local rule database.

According to various embodiments, in operation 670, the hub device may store the local rule data on the basis of the rule information received from the cloud server, and then identify a corresponding operation in the local rule database when a trigger event is generated and perform the operation according thereto.

Figure 7:
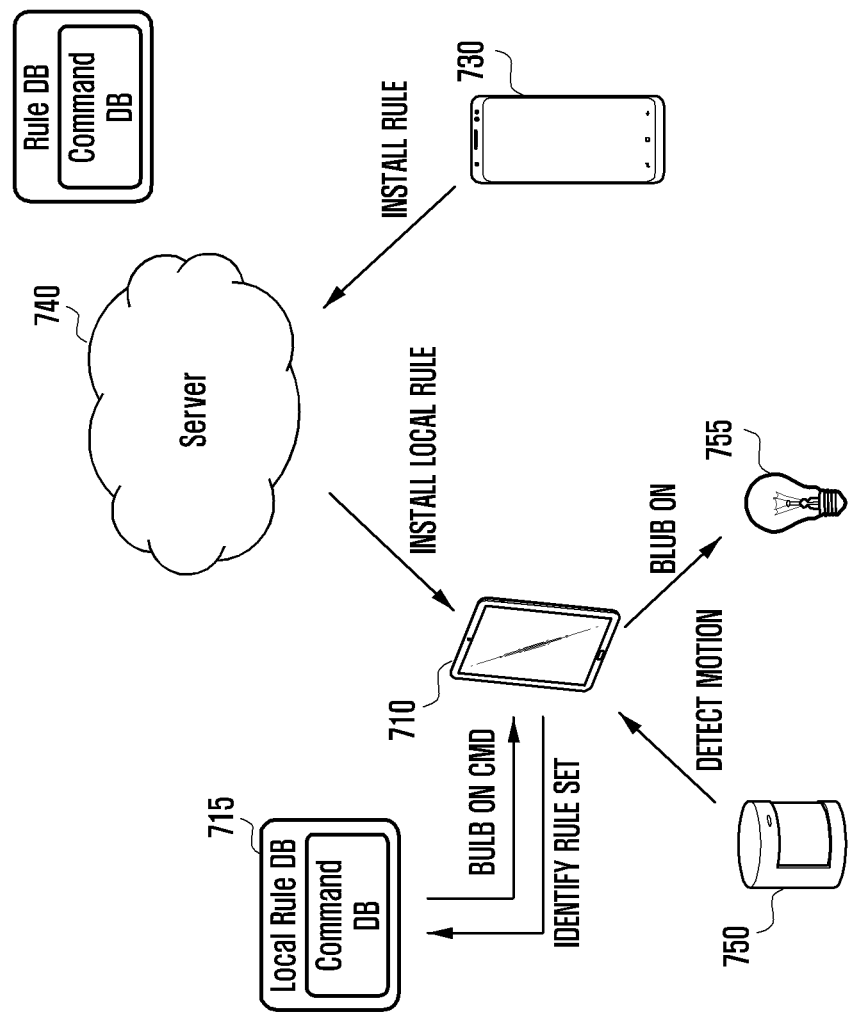
FIG. 7 illustrates an operation of each device for processing local network-based event automation according to an embodiment of the disclosure.

FIG. 7 illustrates an operation of each device for processing local network-based event automation according to an embodiment of the disclosure.

FIG. 7 shows an embodiment in which both a trigger device 750 and an actor device 755 are connected to one hub device 710.

Referring to FIG. 7, when an automation rule is configured in a user device 730 (for example, the user device 330 of FIG. 3 or the user device 401 of FIG. 4) through a user interface of an application, the configured rule may be registered in a cloud server 740. For example, when the trigger device 750 (e.g., a motion sensor) detects motion, an operation of turning on the actor device 755 (e.g., a bulb) may be configured.

According to various embodiments, the hub device 710 may receive rule information of mapping a trigger event, an action command indicating an operation to be performed in response to the trigger event, and an actor device 755 to execute the action command from the cloud server 740 and install the rule information in a local rule database 715. The local rule database 715 may be installed when the hub device 710 is manufactured or firmware is upgraded, and the installed local rule database 715 may be updated according to rule information transmitted from the cloud server 740 when a new rule is configured in the user device 730. According to another embodiment, when receiving rule information of mapping the trigger event, the action command indicating the operation to be performed in response to the trigger event, and the actor device 755 to execute the action command from the cloud server 740, the hub device 710 may perform the operations of FIG. 6 and install the same in the local rule database 715.

According to various embodiments, when detecting motion of an adjacent object, the trigger device 750 may transmit a trigger event to the hub device 710. The hub device 710 may identify an action command and the actor device 755 corresponding to the motion detection trigger event in the command database of the local rule database 715.

According to various embodiments, the hub device 710 may transmit the action command to the identified actor device 755. For example, when the actor device 755 is a bulb, the actor device 755 may perform a turning-on operation of the bulb according to the action command received from the hub device 710.

Figure 8:
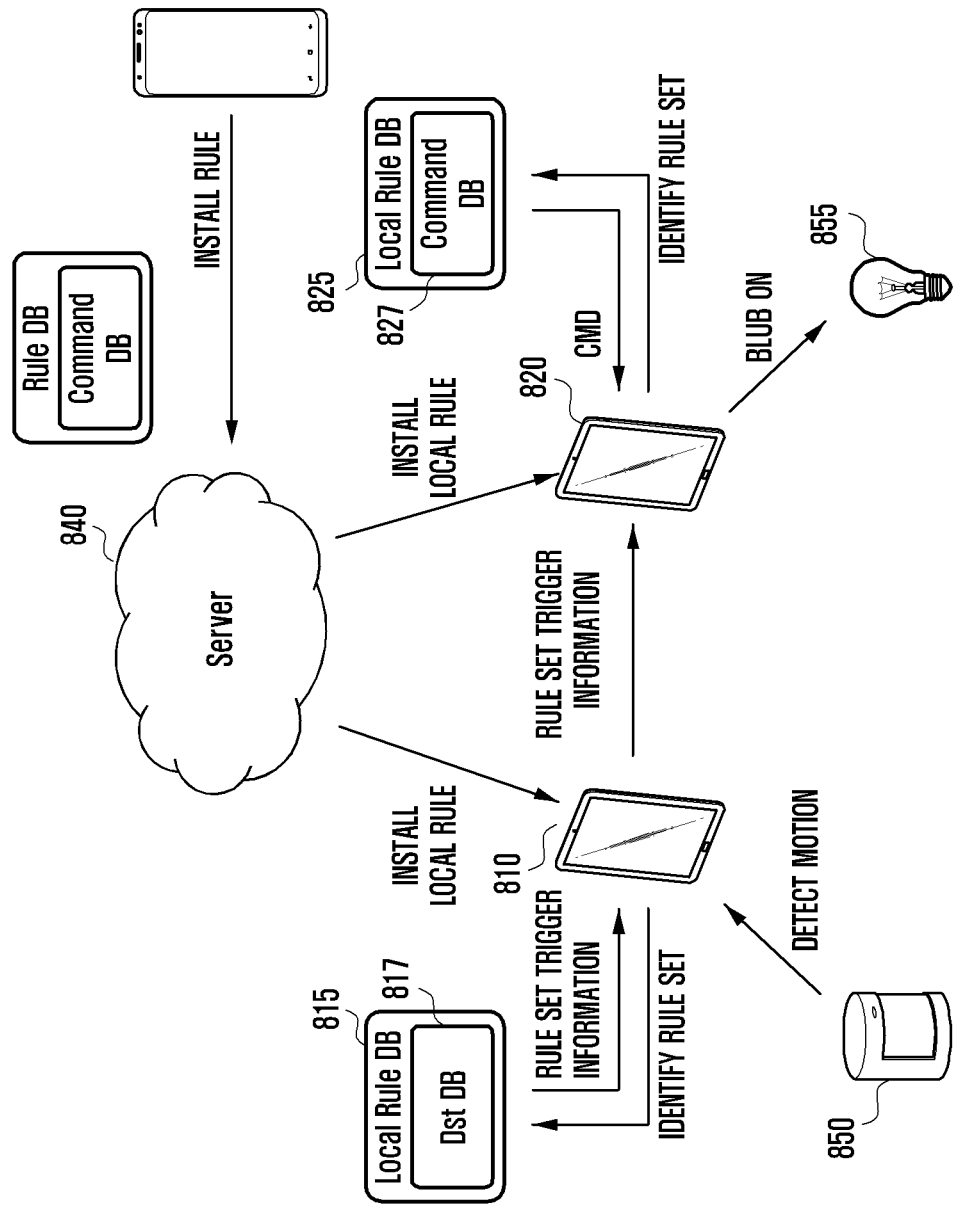
FIG. 8 illustrates an operation of each device for processing local network-based event automation according to an embodiment of the disclosure.

FIG. 8 illustrates an operation of each device for processing local network-based event automation according to an embodiment of the disclosure.

According to various embodiments, rule information may be distributed to and installed in a plurality of hub devices. For example, a trigger rule may be installed in a first hub device 810 connected to a trigger device 850 and an actor rule may be installed in a second hub device 820 connected to an actor device 855.

Referring to FIG. 8, the first hub device 810 may receive trigger rule information of mapping and storing trigger events and rule sets defining rules conducted when the trigger events are generated from the cloud server 840 and store the trigger rule information in a destination database 817 of a local rule database 815 of the first hub device 810. The rule set may have a unique ID, and the destination database 817 may map and store identification information of another hub device or the actor device 855 capable of processing each rule set.

According to various embodiments, the second hub device 820 may store a command database 827 of mapping and storing a trigger event, an action command indicating the operation to be performed when the trigger event is generated, and the actor device 855 to execute the action command in the local rule database 825 of the second hub device 820.

According to various embodiments, when detecting motion of an adjacent object, the trigger device 850 may transmit a trigger event to the first hub device 810. The first hub device 810 may acquire a rule set mapped to the trigger event in the destination database 817 of the local rule database 815. The rule set of the destination database 817 may include identification information of another hub device capable of processing the corresponding rule set.

According to various embodiments, the first hub device 810 may transmit rule set information to the second hub device 820 of the identified rule set. The second hub device 820 may identify the corresponding rule set in the command database 827 and identify the action command and the actor device 855 in the rule set. The second hub device 820 may transmit the action command to the actor device 855, and the actor device 855 may perform the operation according to the received action command.

Figure 9:
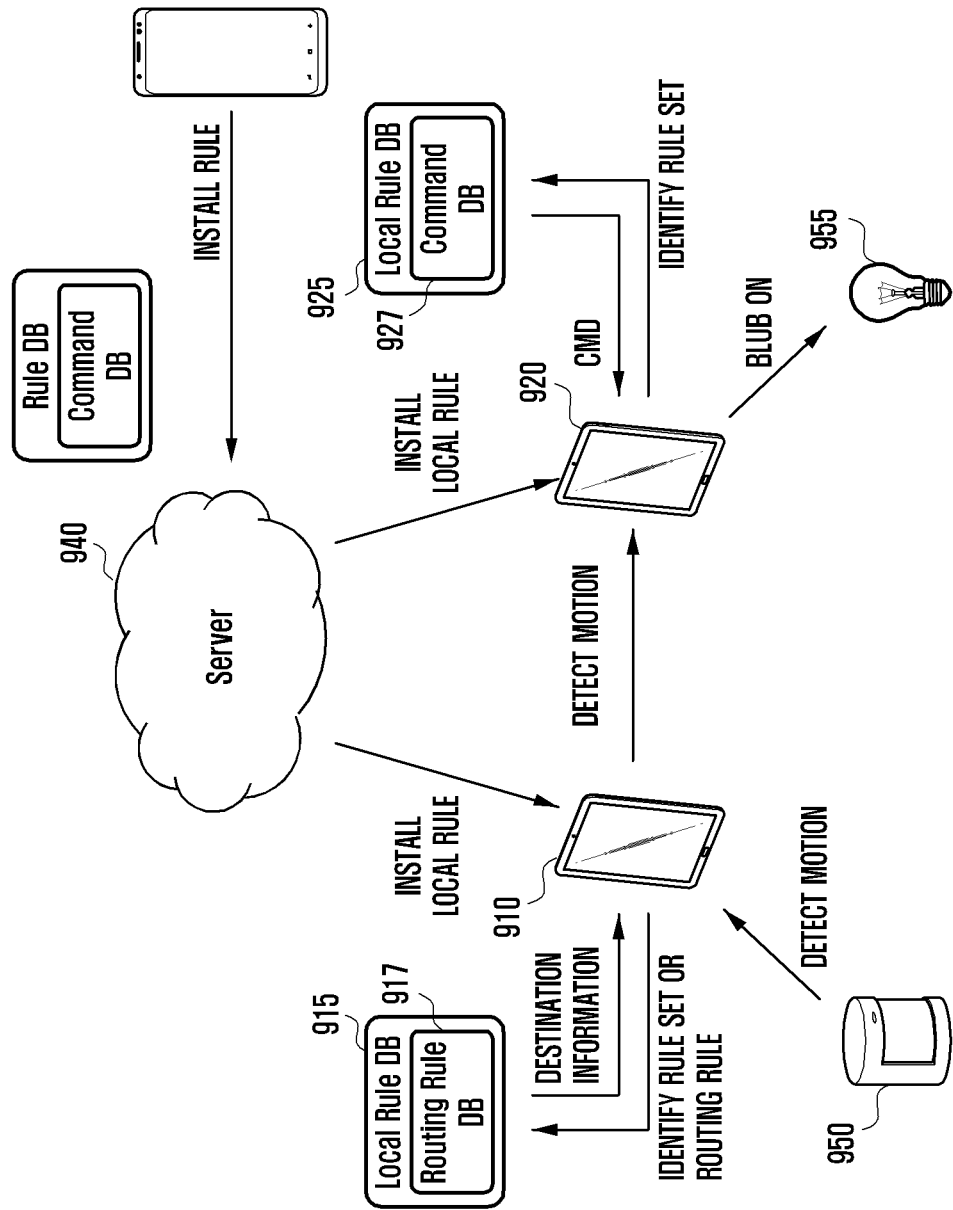
FIG. 9 illustrates an operation of each device for processing local network-based event automation according to an embodiment of the disclosure.

FIG. 9 illustrates an operation of each device for processing local network-based event automation according to an embodiment of the disclosure.

According to various embodiments, a first hub device 910 may receive trigger rule information of mapping a trigger event and a destination to bypass the trigger event from a cloud server 940 and store the trigger rule information in a routing rule database 917 of a local rule database 915 of the first hub device 910. For example, when a trigger event is generated by a specific trigger device 950, the routing rule database 917 may define a rule of mapping identification (for example, a UUID or an IP address) of a second hub device 920 to which the corresponding trigger event is transmitted. According to another embodiment, the second hub device 920 may receive actor rule information of mapping a trigger event, an action command indicating the operation to be performed when the trigger event is generated, and an actor device 955 to execute the action command and store the actor rule information in a command database 927 of a local rule database 925 of the second hub device 920.

According to various embodiments, when detecting motion of an adjacent object, the trigger device 950 may transmit a trigger event to the first hub device 910. The first hub device 910 may identify the second hub device 920 mapped to the trigger event received from the trigger device 950 in the routing rule database 917 and bypass the trigger event to the identified second hub device 920. For example, when the first hub device 910 and the second hub device 920 are included in the same local network, the first hub device 910 may directly bypass the trigger event to the second hub device 920. In another example, when the first hub device 910 and the second hub device 920 are not included in the same local network, the first hub device 910 may bypass the trigger event to the second hub device 920 through a server (for example, the cloud server 940).

When receiving the trigger event from the first hub device 910, the second hub device 920 may identify an action command and the actor device 955 mapped to the received trigger event in the command database 927. The second hub device 920 may transmit the identified action command to the actor device 955. The actor device 955 may perform the operation (for example, turning on the bulb) according to the received action command.

Figure 10:
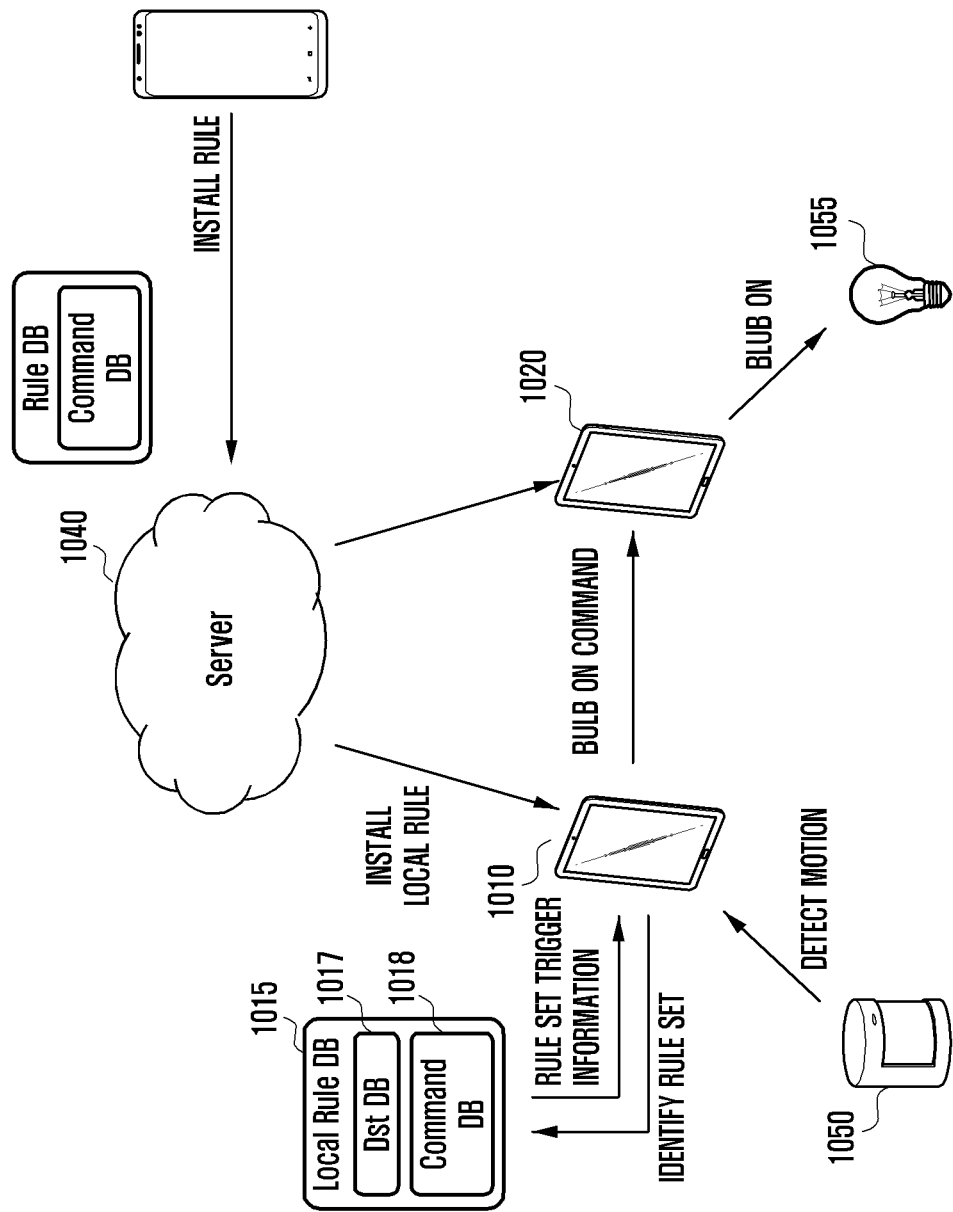
FIG. 10 illustrates an operation of each device for processing local network-based event automation according to an embodiment of the disclosure.

FIG. 10 illustrates an operation of each device for processing local network-based event automation according to an embodiment of the disclosure.

According to various embodiments, a first hub device 1010 may receive rule information of mapping a trigger event and an action command indicating an operation to be performed in response to the trigger event from a cloud server 1040, store the rule information in a command database 1018 of a local rule database 1015 of the first hub device 1010, receive rule information of mapping the trigger event and information on an actor device 1055 to execute the action command from the cloud server 1040 and store the rule information in a destination database 1017.

According to various embodiments, a second hub device 1020 may not store the local rule database.

When receiving a trigger event from the trigger device 1050, the first hub device 110 may identify an action command mapped to the corresponding trigger event in the command database 1018 and identify the second hub device 1020 to transmit the action command in the destination database 1017. The first hub device 1010 may transmit the action command the information on the actor device 1055 to the identified second hub device 1020. The second hub device 1020 may bypass the action command to the corresponding actor device 1055.

The actor device 1055 may perform the operation (for example, turning on the bulb) according to the received action command.

Figure 11:
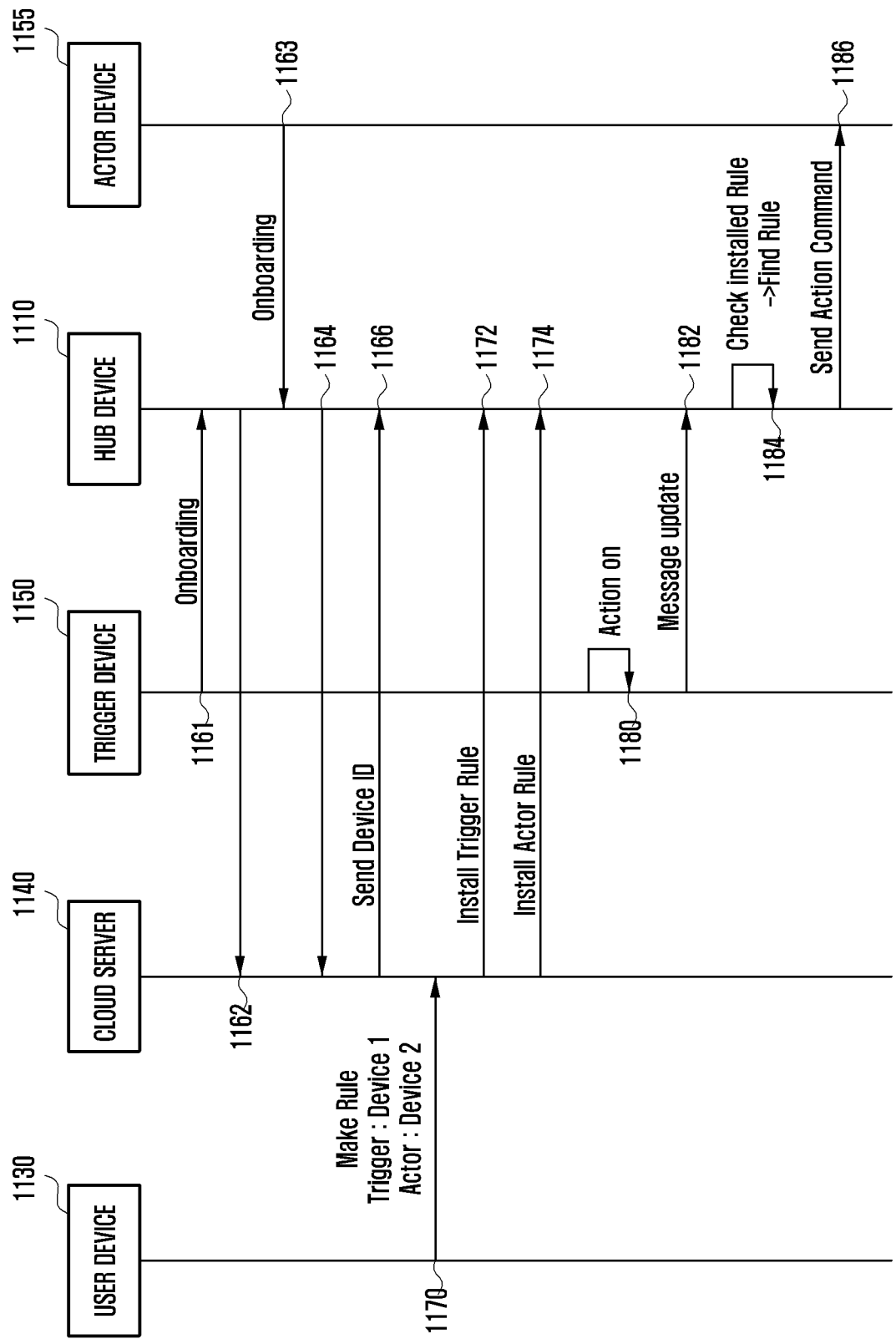
FIG. 11 is a flowchart illustrating a method of processing local network-based event automation according to an embodiment of the disclosure.

FIG. 11 is a flowchart illustrating a method of processing local network-based event automation according to an embodiment of the disclosure.

FIG. 11 illustrates an embodiment in which both a trigger device 1150 (for example, the trigger device 750 of FIG. 7) and an actor device 1155 (for example, the actor device 755 of FIG. 7) are connected to one hub device 1110 (for example, the hub device 710 of FIG. 7) in connection execution of a specific rule.

According to various embodiments, the trigger device 1150 may transmit information on the trigger device 1150 to the hub device 1110 in order to register the trigger device 1150 in the cloud server 1140 in operation 1161, and the hub device 1110 may transmit information on the trigger device 1150 to the cloud server 1140 and register the trigger device 1150 (or onboarding).

According to various embodiments, the actor device 1155 may transmit information on the actor device 1155 to the hub device 1110 in order to register the actor device 1155 in the cloud server 1140 in operation 1163, and the hub device 1110 may transmit the information on the actor device 1155 to the cloud server 1140 and register the actor device 1155 (or onboarding) in operation 1164.

According to various embodiments, in operation 1166, the cloud server 1140 may transmit device IDs of the trigger device 1150 and the actor device 1155 registered in the server to the hub device 1110.

According to various embodiments, operation 1163 and operation 1164 may be perform earlier than operation 1161 and operation 1162, and operation 1166 may be performed after operation 1162 or performed multiple times after operation 1166.

According to various embodiments, in operation 1170, a user device 1130 (for example, the user device 330 of FIG. 3 or the user device 401 of FIG. 4) may configure an automation rule according to a user input through a user interface provided by an application. For example, the automation rule may include a trigger rule including the trigger device 1150 and a trigger event detected by the trigger device 1150, and an actor rule including the actor device 1155 and an operation to be performed by the actor device 1155. The user device 1130 may identify information on the trigger device 1150 and the actor device 1155 registered in the cloud server 1140 through the user interface provided by the application and guide the user to configure the automation rule. The rule configured by the user device 1130 may be transmitted to the cloud server 1140 and stored in the cloud database.

According to various embodiments, in operation 1172, the hub device 1110 may receive trigger rule information from the cloud server 1140 and store the trigger rule information in the local rule database.

According to various embodiments, in operation 1174, actor rule information may be received from the cloud server 1140 and stored in the local rule database.

According to various embodiments, after the hub device 1110 installs the local rule data, the trigger device 1150 may detect a trigger event in operation 1180. For example, a motion sensor may detect motion of a neighboring object.

According to various embodiments, in operation 1182, the trigger device 1150 may transmit the detected trigger event to the hub device 1110.

According to various embodiments, in operation 1184, the hub device 1110 may identify an action command mapped to the trigger event and the actor device 1155 to execute the corresponding action command in the command database of the local rule database. For example, the trigger device 1150 may detect a plurality of trigger events, and the hub device 1110 may identify action commands mapped to the trigger events received from the trigger device 1150 and the actor device 1155 to execute the corresponding action commands in the local rule database.

According to various embodiments, in operation 1186, the hub device 1110 may transmit the action command to the actor device 1155, and the actor device 1155 may perform the requested operation.

Referring to FIG. 11, since the trigger device 1150 and the actor device 1155 related to the rule to be installed are connected to one hub device 1110, the hub device 1110 may install and operate the corresponding rule by itself. One hub device 1110 controls the connected devices, and thus the corresponding devices may perform the automation service without any assistance from the cloud server 1140 unless the devices are removed from the hub device 1110.

Figure 12:
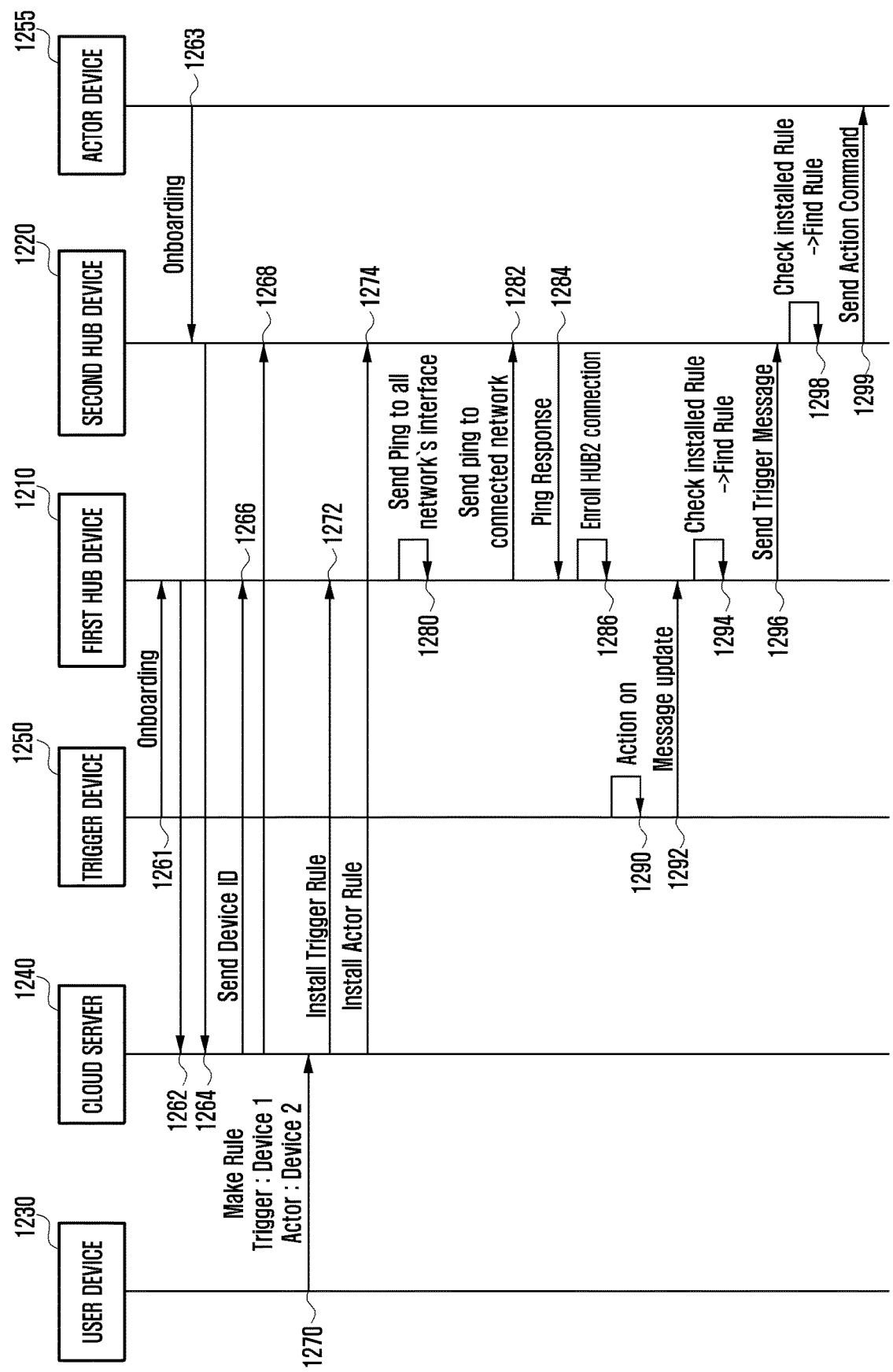
FIG. 12 is a flowchart illustrating a method of processing local network-based event automation according to an embodiment of the disclosure.

FIG. 12 is a flowchart illustrating a method of processing local network-based event automation according to an embodiment of the disclosure.

FIG. 12 shows an embodiment in which a trigger device 1250 is connected to a first hub device 1210, an actor device 1255 is connected to a second hub device 1220 (for example, FIGS. 8 to 10), and the first hub device 1210 and the second hub device 1220 can be directly connected in connection with execution of a specific rule.

According to various embodiments, the trigger device 1250 may transmit information on the trigger device 1250 to the first hub device 1210 in order to register the trigger device 1250 in a cloud server 1240 in operation 1261, and the first hub device 1210 may transmit the information on the trigger device 1250 to the cloud server 1240 and register the trigger device 1250 (or onboarding) in operation 1262.

According to various embodiments, the actor device 1255 may transmit information on the actor device 1255 to the second hub device 1220 in order to register the actor device 1255 in the cloud server 1240 in operation 1263, and the second hub device 1220 may transmit the information on the actor device 1255 to the cloud server 1240 and register the actor device 1255 (or onboarding) in operation 1264.

According to various embodiments, in operation 1266, the cloud server 1240 may transmit device IDs of the trigger device 1250, the actor device 1255, and the second hub device 1220 registered in the server to the first hub device 1210. In operation 1268, the cloud server 1240 may transmit device IDs of the trigger device 1250, the actor device 1255, and the first hub device 1210 registered in the server to the second hub device 1220.

According to various embodiments, the order of operations in which the cloud server 1240 transmits device IDs of the trigger device 1250, the actor device 1255, and at least one hub device (for example, the first hub device 1210 and/or the second hub device 1220) to the first hub device 1210 and/or the second hub device 1220 may be changed or performed multiple times according to the order of registration of the trigger device 1250 or the actor device 1255 in the cloud server 1240 by the first hub device 1210 and/or the second hub device 1220.

According to various embodiments, in operation 1270, a user device 1230 (for example, the user device 330 of FIG. 3 or the user device 401 of FIG. 4) may configure an automation rule according to a user input through a user interface provided by an application and transmit the automation result to the cloud server 1240. For example, the automation rule may include a trigger rule including the trigger device 1250 and a trigger event detected by the trigger device 1250, and an actor rule including the actor device 1255 and an operation to be performed by the actor device 1255. The rule configured by the user device 1230 may be transmitted to the cloud server 1240 and stored in the cloud database.

According to various embodiments, in operation 1272, the first hub device 1210 may receive trigger rule information from the cloud server 1240 and store the trigger rule information in the local rule database. According to another embodiment (for example, FIG. 9), the first hub device 1210 may store a routing database of mapping and storing a trigger event and a destination to bypass the trigger event in the local rule database. According to another embodiment (for example, FIG. 8), the first hub device 1210 may store a destination database of mapping and storing trigger events and rule sets defining rules conducted when the trigger events are generated in the local rule database. According to another embodiment (for example, FIG. 10), the first hub device 1210 may store a command database of mapping a trigger event and an action command indicating an operation to be performed in response to the trigger event and a destination database of mapping and storing information on the actor device 1255 to execute the action command in the local rule database.

According to various embodiments, in operation 1274, the second hub device 1220 may receive actor rule information from the cloud server 1240 and store the actor rule information in the local rule database. According to yet another embodiment (for example, FIG. 9), the second hub device 1220 may store a command database of mapping and storing a trigger event, an action command indicating an operation to be performed when the trigger event is generated, and the actor device 1255 to execute the action command in the local rule database. According to another embodiment (for example, FIG. 8), the second hub device 1220 may store a command database of mapping and storing a trigger event, an action command indicating an operation to be performed when the trigger event is generated, and the actor device 1255 to execute the action command in the local rule database.

According to various embodiments, in operation 1280, the first hub device 1210 may transmit a ping (packet internet groper) to all network interfaces by using the received ID of the second hub device 1220 in order to attempt the connection with the second hub device 1220. Alternatively, in operation 1282, the first hub device 1210 may transmit the ping through a network (for example, Wi-Fi or a mesh network) pre-connected with the second hub device 1220. In operation 1284, the second hub device 1220 may transmit a response to transmission of the ping to the first hub device 1210. In operation 1286, the first hub device 1210 may register (enroll) the connection with the second hub device 1220. According to a further embodiment, the operation in which the first hub device 1210 and the second hub device 1220 register the connection may be performed after the operation (for example, operation 1266 or operation 1268) in which the first hub device 1210 and/or the second hub device 1220 receive information on a counterpart hub device from the cloud server 1240.

According to various embodiments, in operation 1290, the trigger device 1250 may detect a trigger event. For example, a motion sensor may detect motion of a neighboring object.

According to various embodiments, in operation 1292, the trigger device 1250 may transmit the detected trigger event to the first hub device 1210.

According to various embodiments, in operation 1294, the first hub device 1210 may identify a rule mapped to the trigger event in the local rule data of the first hub device 1210. According to various embodiments, in operation 1296, the first hub device 1210 may transmit information related to the trigger event to the second hub device 1220.

According to still another embodiment (for example, FIG. 9), the first hub device 1210 may identify the second hub device 1220 mapped to the corresponding trigger event in the routing database. According to another embodiment (for example, FIG. 8), the first hub device 1210 may identify a rule set mapped to the corresponding trigger event and the second hub device 1220 capable of processing the corresponding rule set in the destination database and transmit information on the corresponding rule set to the identified second hub device 1220. According to another embodiment (for example, FIG. 10), the first hub device 1210 may identify an action command mapped to the corresponding trigger event in the command database and the second hub device 1220 to transmit the action command in the destination database. The first hub device 1210 may transmit the action command the information on the actor device 1255 to the identified second hub device 1220.

According to various embodiments, in operation 1298, the second hub device 1220 may identify a rule mapped to information related to the trigger event transmitted from the first hub device 1210 in the local rule database of the second hub device 1220. In operation 1299, the second hub device 1220 may transmit the action command to the actor device 1255, and the actor device 1255 may perform the requested operation.

According to another embodiment (for example, FIG. 9), the second hub device 1220 may identify an action command and the actor device 1255 mapped to the trigger event in the command database and transmit the identified action command to the actor device 1255. According to another embodiment (for example, FIG. 8), the second hub device 1220 may identify the corresponding rule set in the command database and identify the action command and the actor device 1255 in the rule set. According to another embodiment (for example, FIG. 10), the second hub device 1220 may bypass the action command received from the first hub device 1210 to the corresponding actor device 1255.

As described in the embodiment of FIG. 12, when the trigger device 1250 and the actor device 1255 participating in the rule are connected to different hub devices, the cloud server 1240 may make a request for installing the rule in the first hub device 1210 and the second hub device 1220 connected to the respective devices. The first hub device 1210 may search for the second hub device 1220 by using various communication means in order to find the second hub device 1220 having the actor rule. When the second hub device 1220 is found during a search process, the first hub device 1210 may register a corresponding path and then transmit relevant information to the second hub device 1220 when the trigger event is generated. When the second hub device 1220 receives corresponding information, the second hub device 1220 may execute the action command according to the registered rule.

Figure 13:
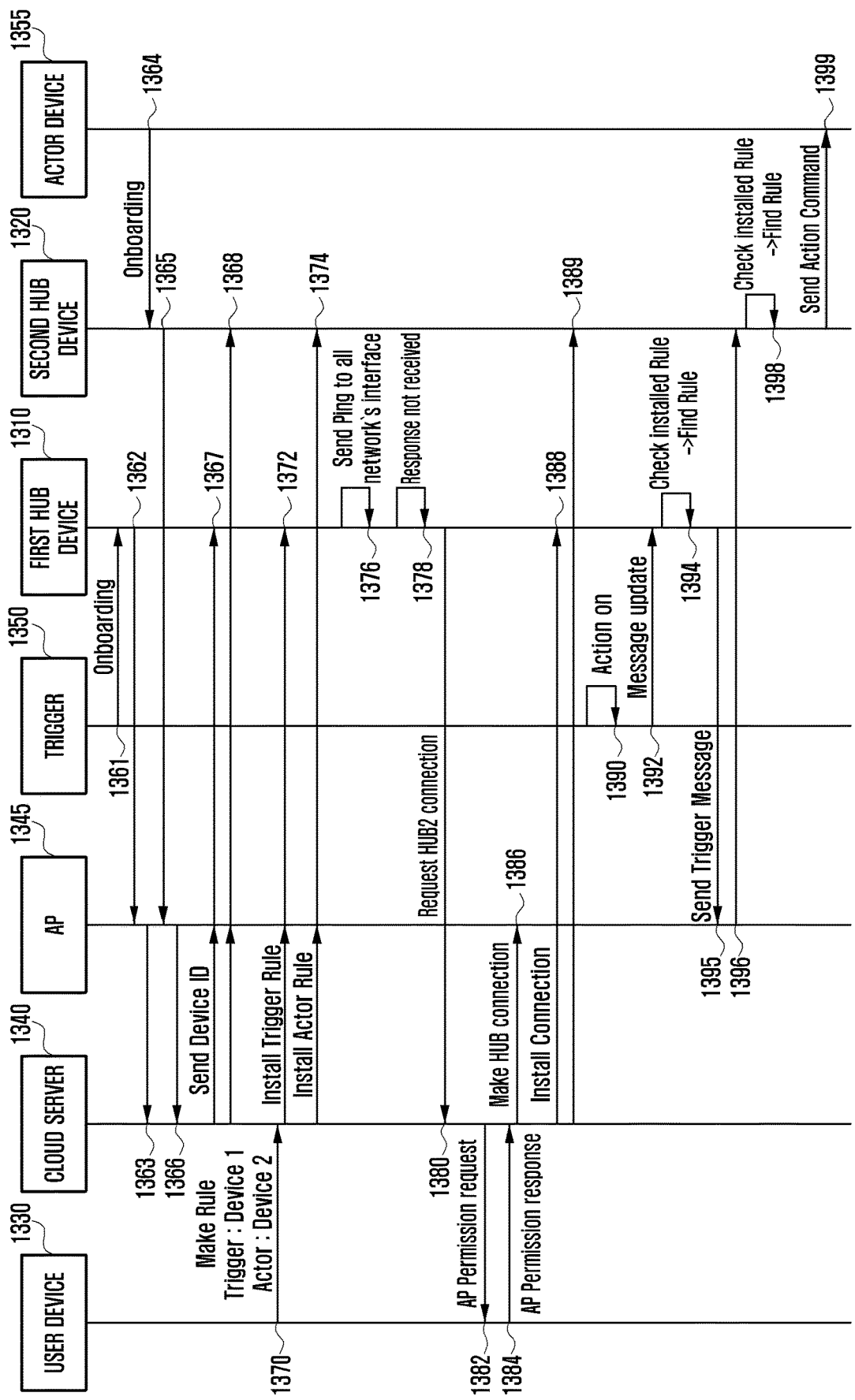
FIG. 13 is a flowchart illustrating a method of processing local network-based event automation according to an embodiment of the disclosure.

FIG. 13 is a flowchart illustrating a method of processing local network-based event automation according to an embodiment of the disclosure.

FIG. 13 shows an embodiment in which a trigger device 1350 is connected to a first hub device 1310, an actor device 1355 is connected to a second hub device 1320 (for example, FIGS. 8 to 10), and the first hub device 1310 and the second hub device 1320 are connected through an access point (AP) 1345 in connection with execution of a specific rule.

According to various embodiments, the trigger device 1350 may transmit information on the trigger device 1350 to the first hub device 1310 in order to register the trigger device 1350 in the cloud server 1340 in operation 1361, and the first hub device 1310 may transmit the information on the trigger device 1350 to the AP 1345 in operation 1362. In operation 1363, the AP 1345 may transmit the information on the trigger device 1350 to the cloud server 1340 and register the trigger device 1350 (or onboarding).

According to various embodiments, the actor device 1355 may transmit information on the actor device 1355 to the second hub device 1320 in order to register the actor device 1355 in the cloud server 1340 in operation 1364, and the second hub device 1320 may transmit the information on the actor device 1355 to the AP 1345 in operation 1365. In operation 1366, the AP 1345 may transmit the information on the actor device 1355 to the cloud server 1340 and register the actor device 1355 (or onboarding).

According to various embodiments, in operation 1367, the cloud server 1340 may transmit device IDs of the trigger device 1350, the actor device 1355, and the second hub device 1320 registered in the server to the first hub device 1310 through the AP 1345. In operation 1368, the cloud server 1340 may transmit device IDs of the trigger device 1350, the actor device 1355, and the first hub device 1310 registered in the server to the second hub device 1320 through the AP 1345.

According to various embodiments, in operation 1370, a user device 1330 (for example, the user device 330 of FIG. 3 or the user device 401 of FIG. 4) may configure an automation rule according to a user input through a user interface provided by an application.

According to various embodiments, in operation 1372, the first hub device 1310 may receive trigger rule information from the cloud server 1340 and store the trigger rule information in the local rule database. Examples of the rule information stored in the local rule database of the first hub device 1310 have been described in detail with reference to FIGS. 8 to 10 and 12.

According to various embodiments, in operation 1374, the second hub device 1320 may receive actor rule information from the cloud server 1340 and store the actor rule information in the local rule database. Examples of the rule information stored in the local rule database of the second hub device 1320 have been described in detail with reference to FIGS. 8 to 10 and 12.

According to various embodiments, in operation 1376, the first hub device 1310 may transmit a ping (packet internet groper) to all network interfaces by using the received ID of the second hub device 1220 in order to attempt the connection with the second hub device 1320. According to various embodiments, in operation 1378, the first hub device 1310 may identify that no response to the pint request is transmitted from the second hub device 1320.

According to various embodiments, in operation 1380, the first hub device 1310 may make a request for the connection with the second hub device 1320 to the cloud server 1340. In operation 1382, the cloud server 1340 may make a request for the connection between a first electronic device and the AP 1345 (AP permission request) to the user device 1330. For example, installation of a rule for tunneling in the AP 1345 may be needed when each device of the local network communicates with the cloud server 1340 through the AP 1345, and access to the AP 1345 through a manager account may be needed during this process. Accordingly, the cloud server 1340 may make a request for allowing the user to have a right to access the AP 1345 through the user device 1330. In operation 1384, the user device 1330 may transmit a connection permission response to the cloud server 1340 on the basis of a user input.

According to various embodiments, in operation 1386, the cloud server 1340 may make a request for stabling the connection between hub devices to the AP 1345.

According to various embodiments, the cloud server 1340 may transmit an install connection to the first hub device 1310 in operation 1388, and transmit an install connection to the second hub device 1320 in operation 1389. The install connection is a process for establishing a communication path connected through the AP 1345, and the first hub device 1310 and the second hub device 1320 may receive the install connection and install information for AP tunneling. For example, the AP 1345 may install a routing rule of transmitting specific port data from the first hub device 1310 to the second hub device 1320, and the first hub device 1310 may install a routing rule of transmitting the corresponding information to the port installed in the AP 1345 through an address of the second hub device 1320 when the trigger event is generated.

According to various embodiments, in operation 1390, the trigger device 1350 may detect a trigger event. For example, a motion sensor may detect motion of a neighboring object.

According to various embodiments, in operation 1392, the trigger device 1350 may transmit the detected trigger event to the first hub device 1310.

According to various embodiments, the first hub device 1310 may identify a rule mapped to the trigger event in the local rule database of the first hub device 1310 in operation 1394 and transmit information related to the trigger event to the AP 1345 in operation 1395. In operation 1396, the AP 1345 may transmit information related to the trigger event transmitted from the first hub device 1310 to the second hub device 1320. Detailed description of the information related to the trigger event transmitted from the first hub device 1310 to the second hub device 1320 through the AP 1345 has been made in detail with reference to FIGS. 8 to 10 and 12.

According to various embodiments, in operation 1398, the second hub device 1320 may identify a rule mapped to information related to the trigger event transmitted from the first hub device 1310 in the local rule database of the second hub device 1320. In operation 1399, the second hub device 1320 may transmit the action command to the actor device 1355, and the actor device 1355 may perform the requested operation.

Figure 14A:
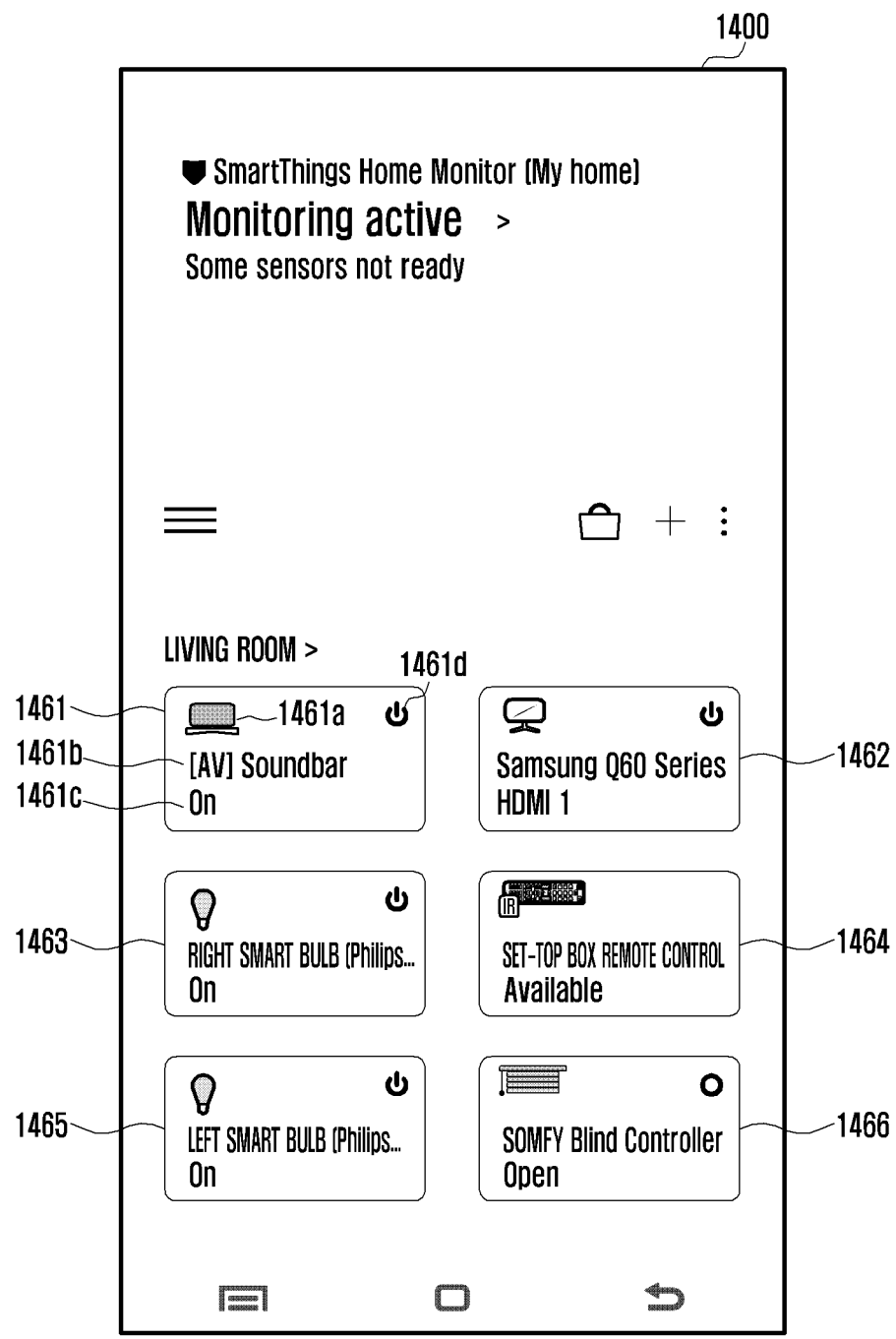
FIGS. 14A, 14B, and 14C illustrate a user interface provided by a user device to control IoT devices according to various embodiments of the disclosure.
Figure 14B:
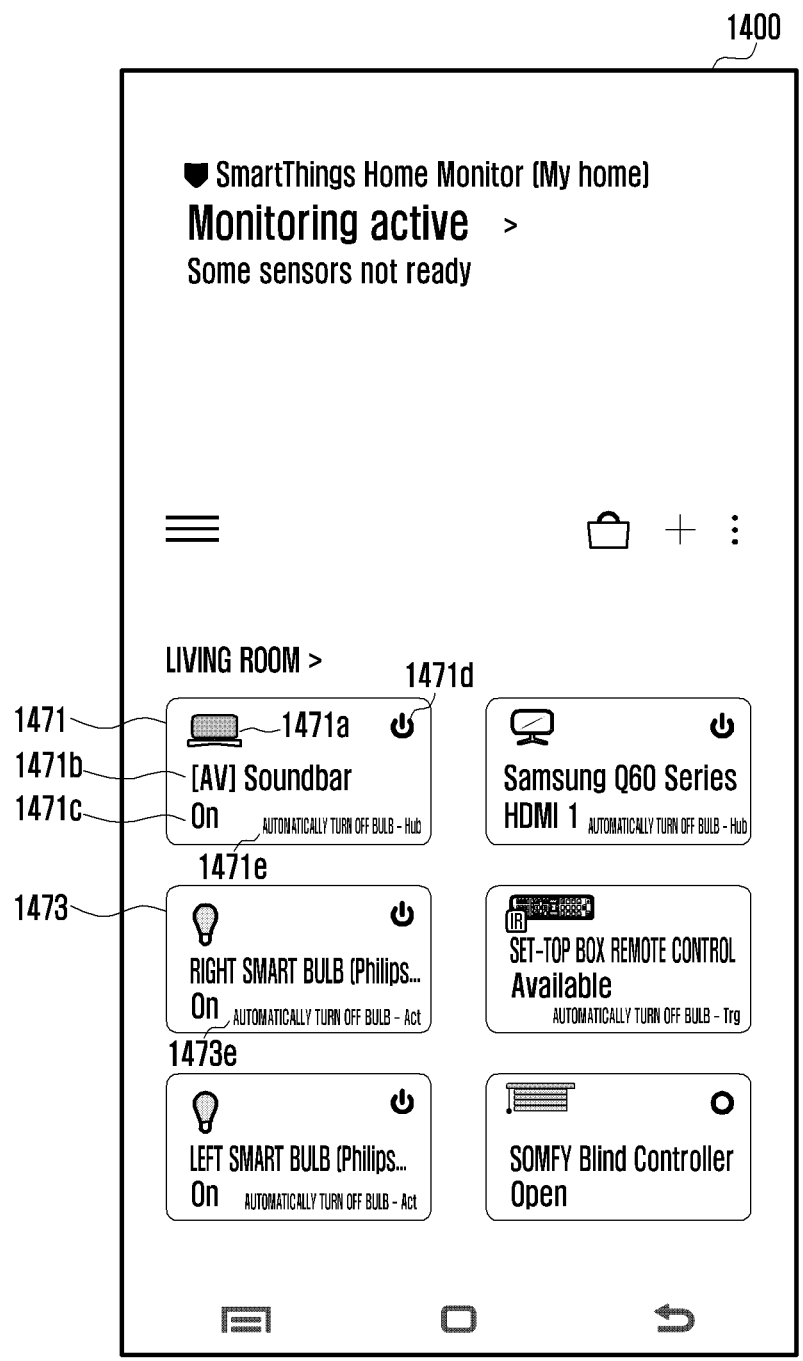
Figure 14C:
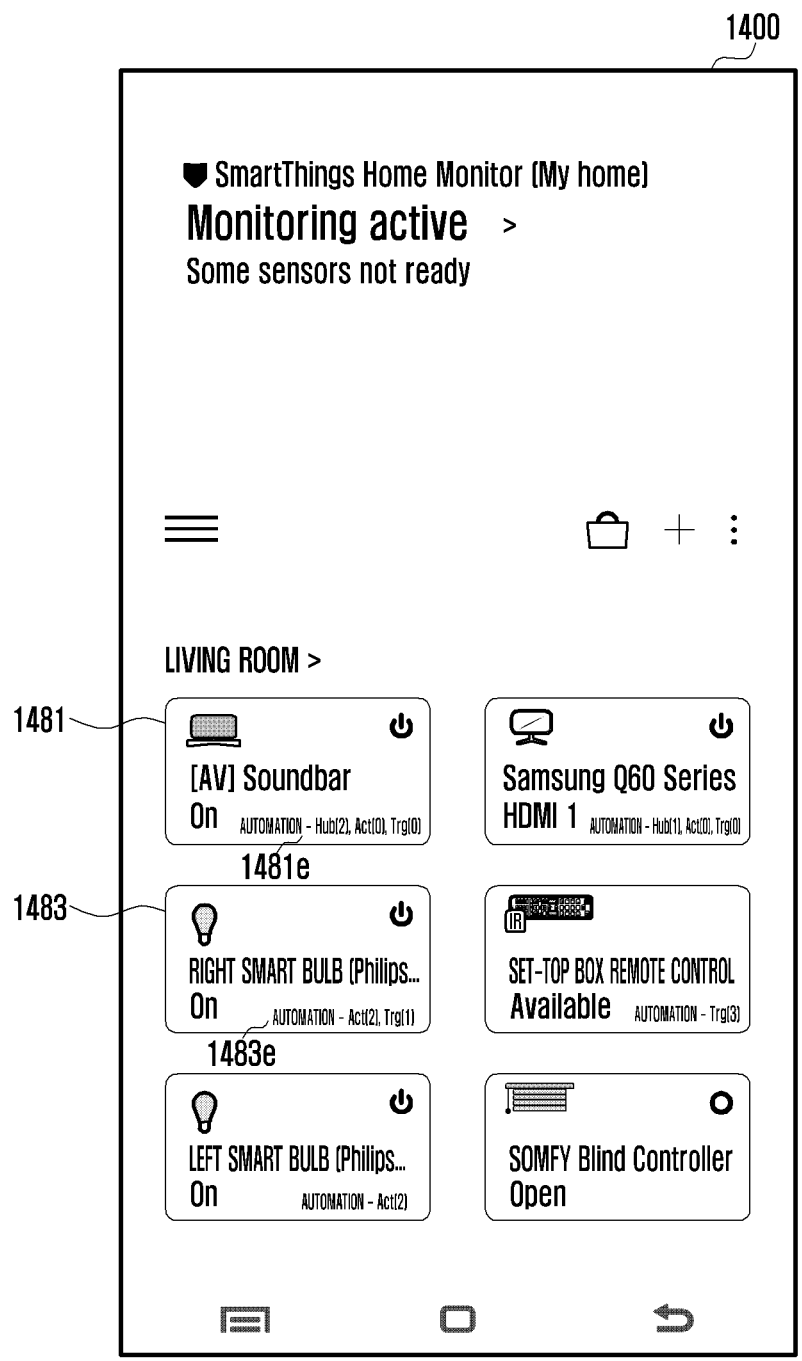

FIGS. 14A, 14B, and 14C illustrate a user interface provided by a user device to control IoT devices according to various embodiments of the disclosure.

According to various embodiments, the user device may execute and display an application for providing device registration, rule configuration, and device control for the automation service.

FIG. 14A illustrates an application supporting the cloud-based automation service (for example, FIG. 3).

Referring to FIG. 14A, a user device 1400 (for example, the user device 330 of FIG. 3 or the user device 401 of FIG. 4) may display UI items corresponding to respective devices (for example, the trigger device, the actor device, and/or the hub device) of the local network. For example, the user device may display an audio/video (AV) sound bar UI item 1461, a TV UI item 1462, a right bulb UI item 1463, a set-top box remote control UI item 1464, a left bulb UI item 1465, and an electric blind controller UI item 1466.

Each UI item may include an image 1461$a$ indicating a device, a device name 1461$b$, information 1461$c$ indicating a device operation state (for example, on/off, available/non-available, or open/close), and a button 1461$d$ for changing the device operation state.

FIG. 14B illustrates an application supporting the local network-based automation service (for example, FIGS. 7 to 10).

Referring to FIG. 14B, a UI item 1471 corresponding to each device may include an image 1471$a$ indicating a device, a device name 1471$b$, information 1471$c$ indicating a device operation state, a button 1471$d$ for changing the device operation state, and information 1471$e$ on a configured automation service.

For example, the AV sound bar may be configured to operate as a hub device for an operation of automatically turning off a bulb (a first bulb or a second bulb), and the information 1471$e$ indicating that the AV sound bar is configured as the hub device may be displayed in the AV sound UI item 1471. Further, information 1473$e$ indicating that the bulb is configured as an actor device may be displayed in the right bulb UI item 1473.

FIG. 14C illustrates an application of a user device when some devices operate as a plurality of subjects in the local network-based automation service.

Referring to FIG. 14C, automation service information of UI items may be information indicating which subject (for example, the hub device, the trigger device, and/or the actor device) of the automation service is configured. For example, information 1481$e$ indicating that the number of rules configured as the hub device is two in the automation service may be displayed in the AV sound bar UI item 1481, and information 1483$e$ indicating that the actor device may operate for two trigger events and the trigger device may operate for a situation in which detection is made in the bulb may be displayed in the right bulb UI item 1483.

Figure 15A:
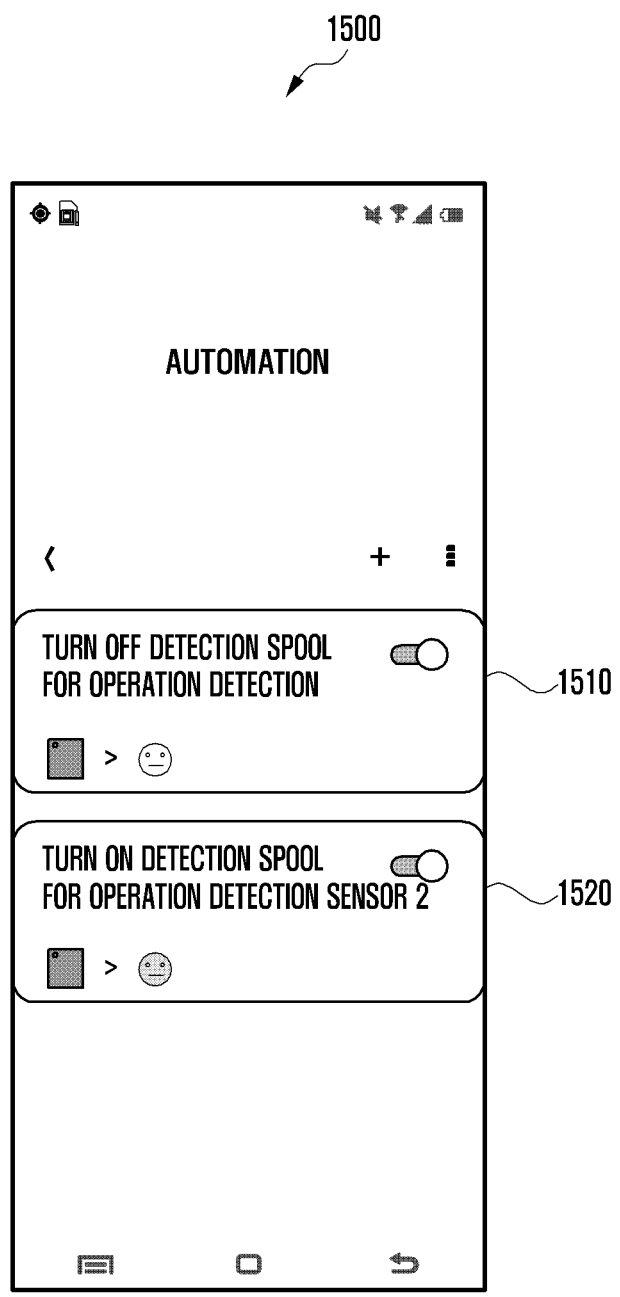
FIGS. 15A and 15B illustrate a user interface providing by a user device to control IoT devices according to various embodiments of the disclosure.
Figure 15B:
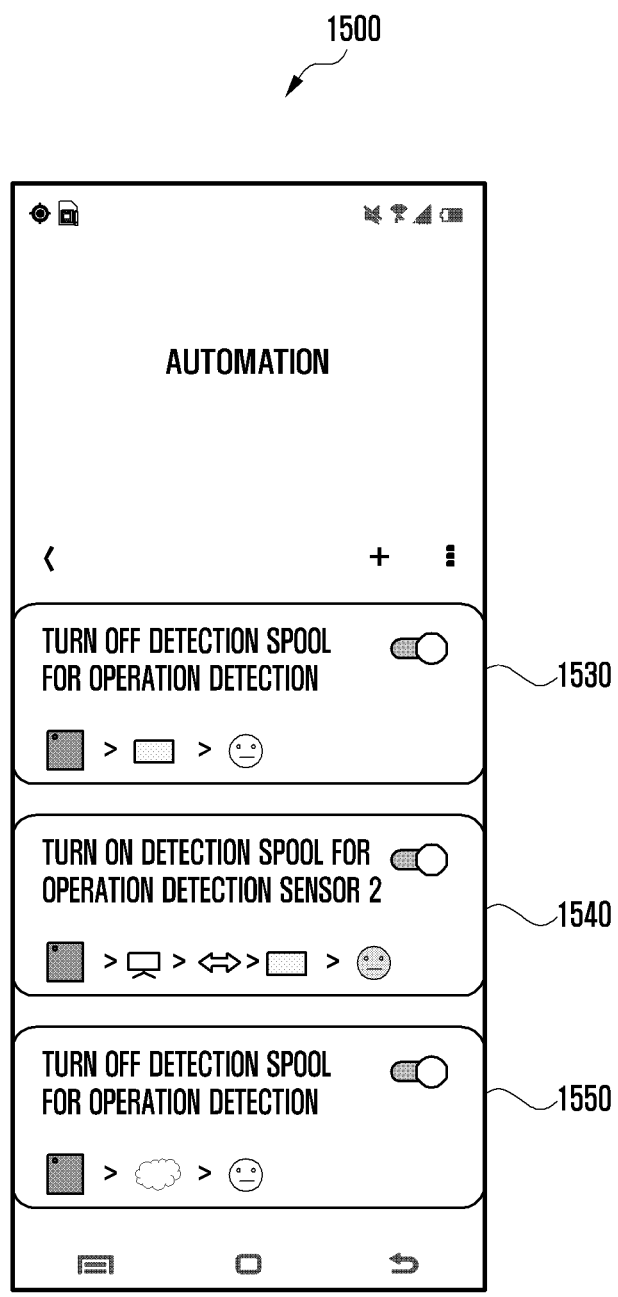

FIGS. 15A and 15B illustrate a user interface providing by a user device to control IoT devices according to various embodiments of the disclosure.

According to various embodiments, a user device 1500 (for example, the user device 330 of FIG. 3 or the user device 401 of FIG. 4) may display automation rules configured by the user in units of rules in the application and provide rule activation/deactivation and rule change functions.

FIG. 15A illustrates an application supporting the cloud-based automation service (for example, FIG. 3).

Referring to FIG. 15A, a first UI item 1510 may indicate a rule of a bulb turning-off operation when a motion sensor detects motion. A second UI item 1520 may indicate a rule of a bulb turning-on operation when the motion sensor detects motion.

FIG. 15B illustrates an application supporting the local network-based automation service (for example, FIGS. 7 to 10).

Referring to FIG. 15B, a first UI item 1530 may indicate that motion detection by the motion sensor is transferred to the hub device and the bulb turning off operation is performed according to an action command transmitted from the hub device.

A second UI item 1540 may indicate a trigger event of the motion sensor, a first hub device connected to the motion sensor, a local network connection between the first hub device and the second hub device, the second hub device connected to the bulb, and a rule including a bulb turning-on operation.

A third UI item 1550 may indicate a trigger event of the motion sensor, a connection between the motion sensor and the bulb through the cloud, and a rule including a bulb turning-off operation.

The hub device 500 according to various embodiments may include the communication module 520, the memory 530, and the processor 510 operatively connected to the communication module 520 and the memory 530, and the processor 510 may be configured to receive rule information of mapping a trigger event detected by a first external device and at least one of a rule set, a destination, or an action command corresponding to the trigger event from a cloud server through the communication module 520 and store the rule information in a local rule database of the memory 530, receive the trigger event from the first external device through the communication module, identify the rule information mapped to the received trigger event in the local rule database, and transmit information related to the trigger event to a second external device through the communication module 520, based on the identified rule information.

According to various embodiments, the second external device may be a hub device located in an equal local network to the hub device 500.

According to various embodiments, the local rule database may include a routing database of mapping the trigger event and a destination to bypass the trigger event, and the processor 510 may be configured to identify the hub device mapped to the received trigger event in the routing database and transmit the trigger event to the hub device.

According to various embodiments, the local rule database may include a destination database of mapping and storing the trigger event and rule sets defining a rule conducted when the trigger event is generated, and the processor 510 may be configured to identify a rule set mapped to the received trigger event in the destination database, identify the hub device capable of conducting the identified rule set, and transmit information on the identified rule set to the hub device.

According to various embodiments, the local rule database may include a command database of mapping and storing the trigger event, an action command indicating an operation to be performed in response to the trigger event, and a third external device to execute the action command, and the processor 510 may be configured to identify the action command and the third external device mapped to the received trigger event in the command database and transmit the identified action command to the hub device connected to the third external device.

According to various embodiments, the local rule database may include a command database of mapping and storing the trigger event, an action command indicating an operation to be performed in response to the trigger event, and the second external device to execute the action command, and the processor may be configured to identify the action command and the second external device mapped to the received trigger event in the command database and transmit the identified action command to the second external device.

According to various embodiments, the processor 510 may be configured to, in case that a connection with the second external device cannot be made through the communication module 520, transmit the information related to the trigger event to the cloud server.

According to various embodiments, the processor 510 may be configured to directly transmit the information related to the trigger event to the second external device through a short-range wireless communication function of the communication module 520 or transmit the information through an access point.

According to various embodiments, the processor 510 may be configured to, in case that update information is received from the cloud server in a state in which the local rule database is stored in the memory 530, update at least some of the local rule database.

A method of processing a local network-based event by the hub device 500 according to various embodiments may include an operation of receiving rule information of mapping a trigger event detected by a first external device and at least one of a rule set, a destination, or an action command corresponding to the trigger event from a cloud server and storing the rule information in a local rule database, an operation of receiving the trigger event from the first external device, an operation of identifying rule information mapped to the received trigger event in the local rule database, and an operation of transmitting information related to the trigger event to a second external device, based on the identified rule information.

According to various embodiments, the second external device may be a hub device located in an equal local network to the hub device 500.

According to various embodiments, the local rule database may include a routing database of mapping and storing the trigger event and a destination to bypass the trigger event, the operation of identifying the rule information mapped to the trigger event may include an operation of identifying the hub device mapped to the received trigger event in the routing database, and the operation of transmitting the information related to the trigger event to the second external device may include an operation of transmitting the trigger event to the hub device.

According to various embodiments, the local rule database may include a destination database of mapping and storing the trigger event and rule sets defining a rule conducted when the trigger event is generated, the operation of identifying the rule information mapped to the trigger event may include an operation of identifying a rule set mapped to the received trigger event in the destination database and an operation of identifying the hub device capable of conducting the identified rule set, and the operation of transmitting the information related to the trigger event to the second external device may include an operation of transmitting information on the identified rule set to the hub device.

According to various embodiments, the local rule database may include a command database of mapping and storing the trigger event, an action command indicating an operation to be performed in response to the trigger event, and a third external device to execute the action command, the operation of identifying the rule information mapped to the trigger event may include an operation of identifying the action command and the third external device mapped to the received trigger event in the command database, and the operation of transmitting the information related to the trigger event to the second external device may include an operation of transmitting the identified action command to the hub device connected to the third external device.

According to various embodiments, the local rule database may include a command database of mapping and storing the trigger event, an action command indicating an operation to be performed in response to the trigger event, and the second external device to execute the action command, the operation of identifying the rule information mapped to the trigger event may include an operation of identifying the action command the second external device mapped to the received trigger event in the command database, and the operation of transmitting the information related to the trigger event to the second external device may include an operation of transmitting the identified action command to the second external device.

According to various embodiments, the method may further include an operation of, in case that a connection with the second external device cannot be made, transmitting the information related to the trigger event to the cloud server.

According to various embodiments, the operation of transmitting the information related to the trigger event to the second external device may include an operation of directly transmitting the information related to the trigger event to the second external device through a short-range wireless communication function of the hub device 500 or transmitting the information through an access point.

According to various embodiments, the method may further include an operation of, in case that update information is received from the cloud server in a state in which the local rule database is stored, updating at least some of the local rule database.

An electronic device according to various embodiments may include a communication module, a memory, and a processor operatively connected to the communication module and the memory, and the processor may be configured to receive rule information of mapping a trigger event, an action command indicating an operation to be performed in response to the trigger event, and a first external device to execute the action command from a cloud server through the communication module and store the rule information in a local rule database of the memory, receive information related to the trigger event from a second external device through the communication module, identify the action command and the first external device to execute the action command in the local rule database, based on the received information related to the trigger event, and transmit the action command to the first external device through the communication module.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to another embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to yet another embodiment, the module may be implemented in a form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to a further embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a communication circuitry;
   memory storing one or more computer programs; and
   one or more processors communicatively coupled to the communication circuitry and the memory,
   wherein the or more computer programs include computer-executable instructions that, when executed by the one or more processors individually or collectively, cause the electronic device to:
   receive rule information of mapping a trigger event detected by a first external device and at least one of a rule set, a destination, or an action command corresponding to the trigger event from a cloud server through the communication circuitry and store the rule information in a local rule database of the memory,
   receive the trigger event from the first external device through the communication circuitry,
   identify the rule information mapped to the received trigger event in the local rule database,
   identify a second external device to perform a specific operation in response to the trigger event based on the rule information, and
   transmit information related to the trigger event to the second external device through the communication circuitry, based on the identified rule information.

2. The electronic device of claim 1, wherein the second external device is a hub device located in an equal local network to the electronic device.

3. The electronic device of claim 1,
   wherein the local rule database comprises a routing database of mapping the trigger event and a destination to bypass the trigger event, and
   wherein the is one or more computer programs further include computer-executable instructions that, when executed by the one or more processors individually or collectively, cause the electronic device to:
   identify the second external device mapped to the received trigger event in the routing database, and
   transmit the trigger event to the second external device.

4. The electronic device of claim 1,
   wherein the local rule database comprises a destination database of mapping and storing the trigger event and rule sets defining a rule conducted when the trigger event is generated, and
   wherein the one or more computer programs further include computer-executable instructions that, when executed by the one or more processors individually or collectively, cause the electronic device to:
   identify a rule set mapped to the received trigger event in the destination database,
   identify the second external device capable of conducting the identified rule set, and
   transmit information on the identified rule set to the second external device.

5. The electronic device of claim 2,
   wherein the local rule database comprises a command database of mapping and storing the trigger event, an action command indicating an operation to be performed in response to the trigger event, and a third external device to execute the action command, and
   wherein the one or more computer programs further include computer-executable instructions that, when executed by the one or more processors individually or collectively, cause the electronic device to:
   identify the action command and the third external device mapped to the received trigger event in the command database, and
   transmit the identified action command to the second external device connected to the third external device.

6. The electronic device of claim 1,
   wherein the local rule database comprises a command database of mapping and storing the trigger event, an action command indicating an operation to be performed in response to the trigger event, and the second external device to execute the action command, and
   wherein the one or more computer programs further include computer-executable instructions that, when executed by the one or more processors individually or collectively, cause the electronic device to:
   identify the action command mapped to the received trigger event in the command database, and
   transmit the identified action command to the second external device.

7. The electronic device of claim 1, wherein the one or more computer programs further include computer-executable instructions that, when executed by the one or more processors individually or collectively, cause the electronic device to, in case that a connection with the second external device cannot be made through the communication circuitry, transmit the information related to the trigger event to the cloud server.

8. The electronic device of claim 1, wherein the one or more computer programs further include computer-executable instructions that, when executed by the one or more processors individually or collectively, cause the electronic device to directly transmit the information related to the trigger event to the second external device through a short-range wireless communication function of the communication circuitry or transmit the information through an access point.

9. The electronic device of claim 1, wherein the one or more computer programs further include computer-executable instructions that, when executed by the one or more processors individually or collectively, cause the electronic device to, in case that update information is received from the cloud server in a state in which the local rule database is stored in the memory, update at least some of the local rule database.

10. A method performed by an electronic device of processing a local network-based event, the method comprising:
receiving, by the electronic device, rule information of mapping a trigger event detected by a first external device and at least one of a rule set, a destination, or an action command corresponding to the trigger event from a cloud server and storing the rule information in a local rule database;
receiving, by the electronic device, the trigger event from the first external device;
identifying, by the electronic device, rule information mapped to the received trigger event in the local rule database;
identifying, by the electronic device, a second external device to perform a specific operation in response to the trigger event based on the rule information; and
transmitting, by the electronic device, information related to the trigger event to the second external device, based on the identified rule information.

11. The method of claim 10, wherein the second external device is a hub device located in an equal local network to the electronic device.

12. The method of claim 10,
wherein the local rule database comprises a routing database of mapping and storing the trigger event and a destination to bypass the trigger event,
wherein the identifying of the rule information mapped to the trigger event comprises identifying the second external device mapped to the received trigger event in the routing database, and
wherein the transmitting of the information related to the trigger event to the second external device comprises transmitting the trigger event to the second external device.

13. The method of claim 10,
wherein the local rule database comprises a destination database of mapping and storing the trigger event and rule sets defining a rule conducted when the trigger event is generated,
wherein the identifying of the rule information mapped to the trigger event comprises:
identifying a rule set mapped to the received trigger event in the destination database, and
identifying the second external device capable of conducting the identified rule set, and
wherein the transmitting of the information related to the trigger event to the second external device comprises transmitting information on the identified rule set to the second external device.

14. The method of claim 11,
wherein the local rule database comprises a command database of mapping and storing the trigger event, an action command indicating an operation to be performed in response to the trigger event, and a third external device to execute the action command,
wherein the identifying of the rule information mapped to the trigger event comprises identifying the action command and the third external device mapped to the received trigger event in the command database, and
wherein the transmitting of the information related to the trigger event to the second external device comprises transmitting the identified action command to the second external device connected to the third external device.

15. The method of claim 10,
wherein the local rule database comprises a command database of mapping and storing the trigger event, an action command indicating an operation to be performed in response to the trigger event, and the second external device to execute the action command,
wherein the identifying of the rule information mapped to the trigger event comprises identifying the action command mapped to the received trigger event in the command database, and
wherein the transmitting of the information related to the trigger event to the second external device comprises transmitting the identified action command to the second external device.

16. The method of claim 10, further comprising:
in case that a connection with the second external device cannot be made, transmitting the information related to the trigger event to the cloud server.

17. The method of claim 10, wherein the transmitting of the information related to the trigger event to the second external device comprises directly transmitting the information related to the trigger event to the second external device through a short-range wireless communication function or transmitting the information through an access point.

18. The method of claim 10, further comprising:
in case that update information is received from the cloud server in a state in which the local rule database is stored in the electronic device, updating at least some of the local rule database.

19. An electronic device comprising:
communication circuitry;
memory storing one or more computer programs; and
one or more processors communicatively coupled to the communication circuitry and the memory,
wherein the one or more computer programs include computer-executable instructions that, when executed by the one or more processors individually or collectively, cause the electronic device to:
receive rule information of mapping a trigger event, an action command indicating an operation to be performed in response to the trigger event, and a first external device to execute the action command from a cloud server through the communication circuitry and store the rule information in a local rule database of the memory,
receive information related to the trigger event from a second external device through the communication circuitry,
identify the action command and the first external device to execute the action command in the local rule database, based on the received information related to the trigger event, transmit the action command to the first external device through the communication circuitry, identify the action command and the first external device to execute the action command in the local rule database, based on the received information related to the trigger event, and transmit the action command to the first external device through the communication circuitry.

20. The electronic device of claim 19, wherein the one or more computer programs further include computer-executable instructions that, when executed by the one or more processors individually or collectively, cause the electronic device to:

in case that update information is received from the cloud server in a state in which the local rule database is stored in the memory, update at least some of the local rule database.

* * * * *